(12) United States Patent
Birkmeir et al.

(10) Patent No.: US 10,498,430 B2
(45) Date of Patent: Dec. 3, 2019

(54) EXPAND DYNAMIC OF TDD SIGNAL DETECTION AND EXPAND ROBUSTNESS AGAINST VOLATILE SIGNALS

(71) Applicant: Andrew Wireless Systems GmbH, Buchdorf (DE)

(72) Inventors: Josef Birkmeir, Donauwoerth (DE); Daniel Schwab, Gersthofen (DE); Florian Krieger, Wechingen (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/993,323

(22) Filed: May 30, 2018

(65) Prior Publication Data

US 2018/0351633 A1    Dec. 6, 2018

Related U.S. Application Data

(60) Provisional application No. 62/512,381, filed on May 30, 2017.

(51) Int. Cl.
*H04B 7/155* (2006.01)
*H04B 7/26* (2006.01)
(Continued)

(52) U.S. Cl.
CPC ........ *H04B 7/15557* (2013.01); *H04B 7/2643* (2013.01); *H04B 7/2656* (2013.01); *H04J 3/14* (2013.01); *H04L 5/1461* (2013.01); *H04W 52/0245* (2013.01); *H04W 52/143* (2013.01); *H04W 56/008* (2013.01); *H04B 1/00* (2013.01); *H04B 7/022* (2013.01); *H04W 88/085* (2013.01)

(58) Field of Classification Search
None
See application file for complete search history.

(56) References Cited

U.S. PATENT DOCUMENTS

| | | |
|---|---|---|
| 2009/0316611 A1 | 12/2009 | Stratford et al. |
| 2009/0318089 A1 | 12/2009 | Stratford et al. |

(Continued)

FOREIGN PATENT DOCUMENTS

| | | |
|---|---|---|
| WO | 2007074949 A1 | 7/2007 |

OTHER PUBLICATIONS

International Searching Authority, "International Search Report and Written Opinion from PCT Application No. PCT/EP2018/064232 dated Oct. 24, 2018"; From PCT Counterpart of U.S. Appl. No. 15/993,323; pp. 1-18; Published in WO.

(Continued)

*Primary Examiner* — Huy D Vu
*Assistant Examiner* — Bao G Nguyen
(74) *Attorney, Agent, or Firm* — Fogg & Powers LLC

(57) ABSTRACT

A method for determining threshold signal power for a switching control module of a TDD switching sub-system includes setting a threshold signal power to a first value, wherein the threshold signal power is compared to a measured signal power of a downlink path signal of a telecommunication system from a measurement receiver; determining a first downlink signal time using the first value; adjusting the threshold signal power to a second value; determining a second downlink signal time using the second value; determining a difference between the first and second downlink signal times; when difference between the first and second downlink signal times does not exceed a predetermined threshold, determining whether the second downlink signal time corresponds to a valid downlink signal time; when second downlink signal time corresponds to a valid downlink signal time, setting a fixed threshold signal power for use during online operation of the switching control module.

27 Claims, 14 Drawing Sheets

(51) Int. Cl.
*H04W 52/02* (2009.01)
*H04J 3/14* (2006.01)
*H04L 5/14* (2006.01)
*H04W 52/14* (2009.01)
*H04W 56/00* (2009.01)
*H04B 1/00* (2006.01)
*H04W 88/08* (2009.01)
*H04B 7/022* (2017.01)

(56) References Cited

U.S. PATENT DOCUMENTS

| | | | | |
|---|---|---|---|---|
| 2014/0376434 | A1* | 12/2014 | Hirai | H04W 52/0225 370/311 |
| 2015/0249513 | A1* | 9/2015 | Schwab | H04L 5/1469 370/278 |
| 2016/0127065 | A1 | 5/2016 | Schwab et al. | |

OTHER PUBLICATIONS

ETSI, "Technical Specification: LTE; Evolved Universal Terrestrial Radio Access (E-UTRA); Physical Channels and Modulation (3GPP TS 36.211 Version 14.2.0 Release 14)", Dated Apr. 2017, pp. 1-196.
International Searching Authority, "Invitation to Pay Additional Fees and Partial International Search Report from PCT Application No. PCT/EP2018/064232 dated Aug. 27, 2018", from PCT Counterpart of U.S. Appl. No. 15/993,323; pp. 1-11; Published in EP.

\* cited by examiner

| | sub frame | | | | | | | | | |
|---|---|---|---|---|---|---|---|---|---|---|
| | 0 | 1 | 2 | 3 | 4 | 5 | 6 | 7 | 8 | 9 |
| 0 | DL | SSF | UL | UL | UP | DL | SSF | UL | UL | UL |
| 1 | DL | SSF | UL | UL | DL | DL | SSF | UL | UL | DL |
| 2 | DL | SSF | UL | DL | DL | DL | SSF | UL | DL | DL |
| 3 | DL | SSF | UL | UL | UL | DL | DL | DL | DL | DL |
| 4 | DL | SSF | UL | UL | DL | DL | DL | DL | DL | DL |
| 5 | DL | SSF | UL | DL | DL | DL | DL | DL | DL | DL |
| 6 | DL | SSF | UL | UL | UL | DL | SSF | UL | UL | DL |

(config rows)

FIG. 4A

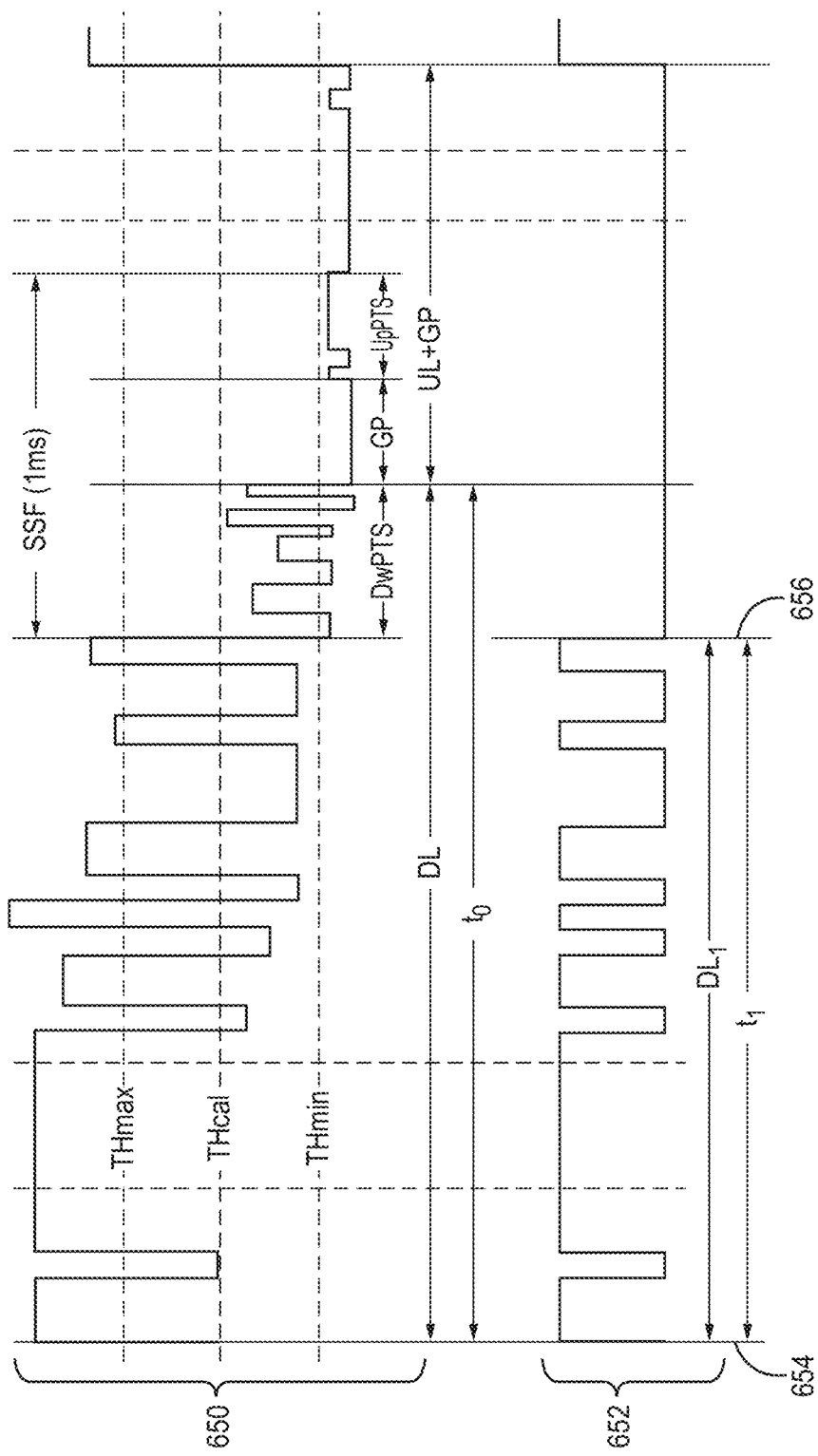

EXPAND DYNAMIC OF TDD SIGNAL DETECTION AND EXPAND ROBUSTNESS AGAINST VOLATILE SIGNALS

CROSS-REFERENCE TO RELATED APPLICATIONS

This application claims the benefit of U.S. Provisional Application Ser. No. 62/512,381, filed May 30, 2017, and titled "EXPAND DYNAMIC OF TDD SIGNAL DETECTION AND EXPAND ROBUSTNESS AGAINST VOLATILE SIGNALS," which is hereby incorporated herein by reference.

BACKGROUND

Telecommunications operators use telecommunication systems to provide signal coverage to coverage zones in which wireless devices are located. A distributed antenna system ("DAS") may be used to extend the coverage of such telecommunication systems. Such distributed antenna systems include signal paths between base stations or other signal sources operated by telecommunication operators and remote antenna units positioned in one or more geographical coverage areas.

In some implementations, a DAS may be configured for time division duplexing ("TDD") operations in which downlink and uplink signals are respectively transmitted and received using at least some common frequencies or common portions of a signal path. A DAS configured for TDD operations may include one or more switches for isolating downlink signal paths from uplink signal paths.

In some cases, multiple telecommunication operators may use the same DAS for extending the coverage of their respective telecommunication systems. An entity responsible for configuring or otherwise operating the DAS may be independent of the telecommunication operators that use the DAS. The entity being independent of the telecommunication operators may present disadvantages. For example, it may be difficult or infeasible to configure the switching operations of the DAS in accordance with the TDD configuration used by the telecommunication operators.

Systems and methods for optimizing TDD switching operations for a DAS are desirable.

SUMMARY

In an embodiment, a method for determining threshold signal power for a switching control module of a time-division-duplexing (TDD) switching sub-system includes setting a threshold signal power to a first value, wherein the threshold signal power is compared to a measured signal power of a downlink signal of a downlink path of a telecommunication system from a measurement receiver. The method further includes determining a first downlink signal time using the first value. The method further includes adjusting the threshold signal power to a second value. The method further includes determining a second downlink signal time using the second value. The method further includes determining a difference between the first downlink signal time and the second downlink signal time. The method further includes when the difference between the first downlink signal time and the second downlink signal time does not exceed a predetermined threshold time, determining whether the second downlink signal time corresponds to a valid downlink signal time. The method further includes when the second downlink signal time corresponds to a valid downlink signal time, setting a fixed threshold signal power for use during online operation of the switching control module.

BRIEF DESCRIPTION OF THE DRAWINGS

FIG. 4A is a diagram of example subframe configurations for a LTE TDD signal.

FIGS. 7A-7C are example graphs of a simplified LTE TDD signal and an example signal output from a comparator of a switching control module of the TDD switching sub-system according to an aspect of the present disclosure.

DETAILED DESCRIPTION

Figure 1:
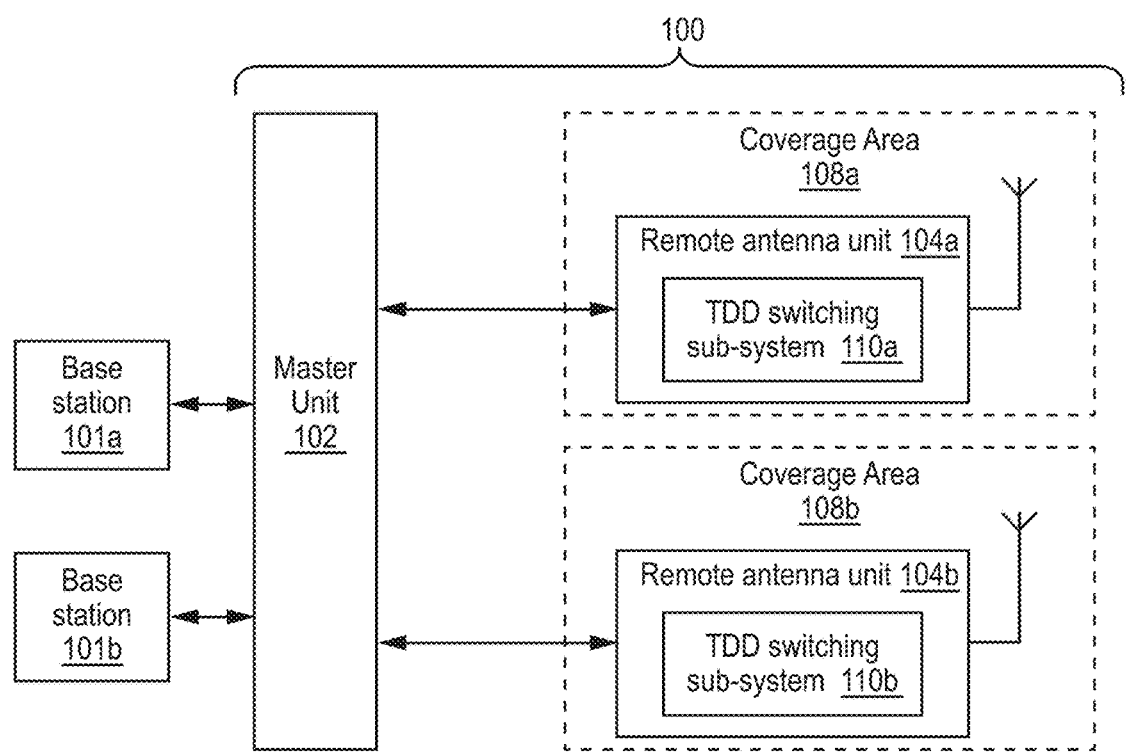
FIG. 1 is a block diagram of an example of a distributed antenna system having a time-division duplexing ("TDD") switching sub-system according to an aspect of the present disclosure.

Certain aspects and examples are directed to switching sub-systems for a distributed antenna system ("DAS") configured for time division duplexing ("TDD") operations. For example, the DAS can use a switching sub-system to switch between an uplink mode for communicating TDD signals in an uplink direction and a downlink mode for communicating TDD signals in a downlink direction. The switching sub-system can automatically determine switching times for the DAS based on determining whether a signal level for downlink signals exceeds a threshold level. One or more switches of the switching sub-system can switch a remote antenna unit of the DAS to the downlink mode by selectively connecting one or more components of the downlink path in the remote antenna unit and disconnecting one or more components of a corresponding uplink path in the remote antenna unit. One or more switches of the switching sub-system can switch a remote antenna unit of the DAS to the uplink mode by selectively connecting one or more components of the uplink path in the remote antenna unit and disconnecting one or more components of a corresponding downlink path in the remote antenna unit. In some aspects, the switching sub-system can switch a remote antenna unit of the DAS to a standby mode or other mode by disconnecting one or more components of the uplink path and the downlink path in the remote antenna unit of the DAS.

In accordance with some aspects, the switching sub-system can include a switching control module that detects the downlink/uplink ratio of base stations in communication with the DAS. The switching control module can determine an initial clock setting based on the downlink/uplink ratio. The initial clock setting can determine the timing for sending command signals to the switches of the switching sub-system that instruct the switches to switch the DAS between an uplink mode and a downlink mode.

The switching control module can also optimize a clock setting that controls switching times for the switches. Optimizing the switching times can maximize or otherwise improve data throughput via the DAS. The switching control module can optimize the clock setting by determining start or end times for respective downlink subframes transmitted via the downlink path. The switching control module can determine the start or end times based on when signal power measurements for the downlink path exceed a threshold signal power. The switching control module can statistically determine a switching time adjustment based on a set of switching time differentials between the initial clock setting and the determined start or end times for the downlink subframes. For example, the switching time adjustment may be the statistical mean of the set of switching time differentials. The switching control module can update the clock setting based on the switching time adjustment.

The switching control module can be used to automatically determine a TDD configuration for one or more telecommunication operators using the DAS. Automatically determining the TDD configuration can reduce or eliminate the need for manual configuration of the DAS with respect to each telecommunication operator. Reducing or eliminating the need for manual configuration of the DAS can reduce or avoid problems resulting from missing information with respect to the configuration settings of different telecommunication operators. The switching control module can also compensate for uplink or downlink pulsing variation or other deficiencies components of the DAS in the uplink or downlink direction, such as a jitter or clock frequency drift experienced by one or more reference clock devices in the DAS.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a block diagram depicting an example of DAS 100 having a TDD switching sub-system 110 according to an aspect of the present disclosure. The DAS 100 can include a master unit 102 in communication with remote antenna units 104*a*, 104*b* and with base stations 101*a*, 101*b*. In some aspects, different base stations can communicate signals associated with different telecommunication operators. The DAS 100 can be positioned in a geographical area (e.g., a stadium, an office building, etc.) to extend wireless communication coverage of the base stations 101*a*, 101*b* into geographical coverage areas 108*a*, 108*b*.

The DAS 100 or other telecommunication system can include downlink paths for transporting downlink signals from the base stations 101*a*, 101*b* to one or more of the remote antenna units 104*a*, 104*b*. The DAS 100 can receive downlink signals from the base stations 101*a*, 101*b* via a wired or wireless communication medium. Downlink signals can include signals provided from the base stations 101*a*, 101*b* and transmitted by the remote antenna units 104*a*, 104*b* in the coverage areas 108*a*, 108*b*. A non-limiting example of a remote antenna unit is a universal access point.

The DAS 100 or other telecommunication system can also include uplink paths for transporting uplink signals from one or more of the remote antenna units 104*a*, 104*b* to one of more of the base stations or repeaters. Uplink signals are signals at frequencies in an uplink frequency band that are recovered or otherwise received by one or more of the remote antenna units 104*a*, 104*b* from communication devices in the coverage areas 108*a*, 108*b*.

The master unit 102 can communicate signals between the base stations 101*a*, 101*b* and the remote antenna units 104*a*, 104*b*. An example of a master unit 102 is a wireless conversion station. The master unit 102 and remote antenna unit(s) 104*a*, 104*b* can communicate via any suitable communication medium. The communication medium can be any suitable medium for providing a serial communication link between the master unit 102 and the remote antenna unit 104*a*, 104*b*. In some aspects, the communication medium can be an optical fiber. In other aspects, the communication medium can include copper cables, microwave links, etc. The master unit 102 and remote antenna units 104*a*, 104*b* can include analog-to-digital and digital-to-analog converters for digital communication over a serial link.

For illustrative purposes, FIG. 1 depicts a single master unit 102 in communication with two base stations 101*a*, 101*b* and two remote antenna units 104*a*, 104*b*. However, a distributed antenna system 100 can include any number of master units and any number of remote antenna units for communicating signals between any number of base stations or other signal sources and any number of coverage areas.

A DAS 100 can include other devices in addition to master units and remote antenna units. For example, in some aspects, the DAS 100 may include a base station router or other interface device that receives signals from base stations 101*a*, 101*b* and provides the signals to the master unit 102. In some aspects, the DAS 100 may include one or more extension units that communicate signals between the master unit 102 and the remote antenna units 104*a*, 104*b*.

The DAS 100 can be configured for TDD operations that support multiple operators communicating signals via the DAS 100. For example, the DAS 100 can switch between an uplink mode for communicating TDD signals in an uplink direction and a downlink mode for communicating TDD signals in a downlink direction.

The remote antenna units 104*a*, 104*b* can respectively include TDD switching sub-systems 110*a*, 110*b* used to connect components of the downlink path in response to detecting downlink signals having signal levels exceeding a threshold level. The TDD switching sub-systems 110*a*, 110*b* can analyze downlink signals to determine if signal levels for the downlink signals exceed specified threshold levels. Each of the TDD switching sub-systems 110*a*, 110*b* can include switches that switch a respective one of the remote antenna units 104*a*, 104*b* to the downlink mode by selectively connecting one or more components of the downlink path in the remote antenna unit and disconnecting one or more components of a corresponding uplink path in the remote antenna unit.

Figure 2:
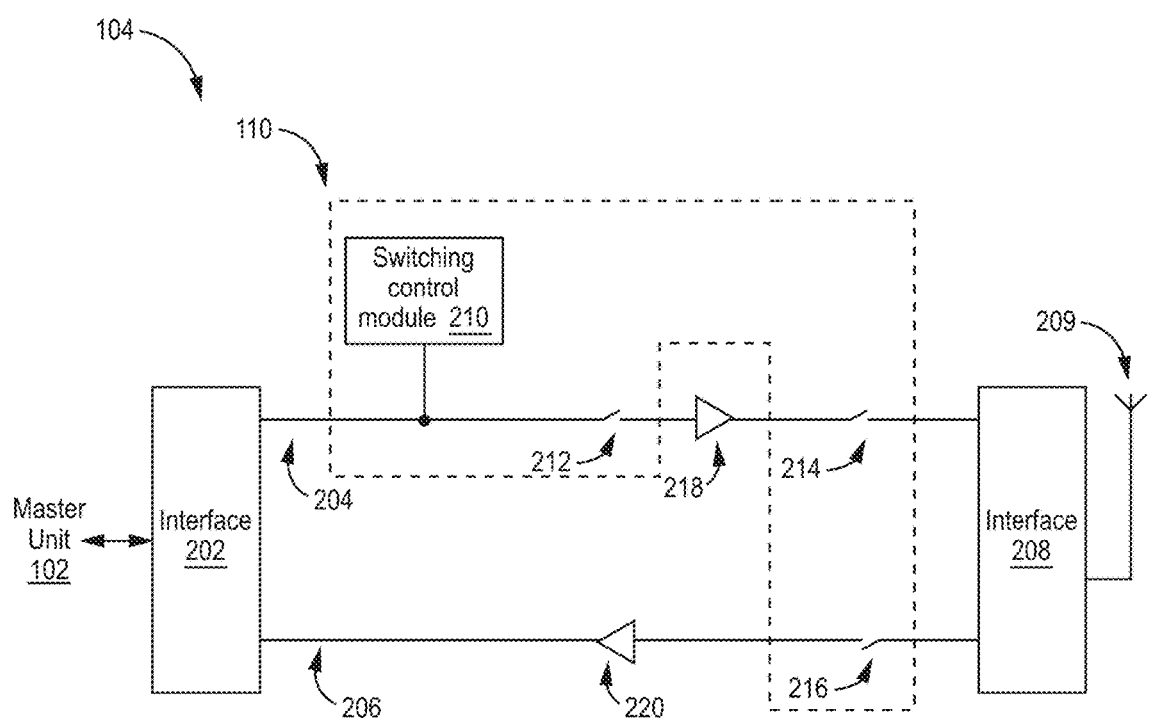
FIG. 2 is a block diagram of an example of a remote antenna unit with a TDD switching sub-system according to an aspect of the present disclosure.

FIG. 2 is a block diagram depicting an example of a remote antenna unit 104 with a TDD switching sub-system 110 according to an aspect of the present disclosure. In a downlink direction, downlink signals received from the master unit 102 via an interface 202 can traverse a downlink path 204 and can be coupled to an antenna 209 via an interface 208 for transmission to communication devices in a coverage area. In an uplink direction, uplink signals received by the antenna 209 can be coupled to an uplink path 206 via the interface 208 and can traverse the uplink path 206 for transmission to the master unit 102 via the interface 202.

The TDD switching sub-system 110 can include one or more components of the downlink path 204 and the uplink path 206. For example, FIG. 2 depicts a TDD switching sub-system 110 that includes a switching control module 210, switches 212, 214 in the downlink path 204, and a switch 216 in the uplink path 206. The switching control module 210 can be coupled to the downlink path 204 in any suitable manner. The switch 212 can be positioned in the downlink path 204 between the interface 202 and a power amplifier 218. The switch 214 can be positioned in the downlink path 204 between the power amplifier 218 and the interface 208. The switch 216 can be positioned in the uplink path 206 between the interface 208 and a low noise amplifier 220.

The switching control module 210 can control the operation of the switches 212, 214, 216 to selectively allow communication of downlink signals via the downlink path 204 or uplink signals via the uplink path 206. The switching control module 210 can control the switches 212, 214, 216 by sending switching signals to the switches 212, 214, 216 or devices actuating the switches 212, 214, 216 (not depicted in FIG. 2). The switching control module 210 can be communicatively coupled to the switches 212, 214, 216 or devices actuating the switches 212, 214, 216 via any suitable mechanism. For example, the remote antenna unit 104 may include a printed circuit board or other communication bus via which switching signals from the switching control module 210 can provided to the switches 212, 214, 216 or devices actuating the switches 212, 214, 216. For downlink transmission, the switching control module 210 can provide switching signals that cause the switches 212, 214 to be closed and the switch 216 to be opened, thereby completing the downlink path 204 between the interfaces 202, 208 and opening the uplink path 206 between the interfaces 202, 208. For uplink transmission, the switching control module 210 can provide switching signals that cause the switches 212, 214 to be opened and the switch 216 to be closed, thereby opening the downlink path 204 between the interfaces 202, 208 and completing the uplink path 206 between the interfaces 202, 208. Any suitable switches 212, 214, 216 can be used. Non-limiting example of suitable switches 212, 214, 216 include RF switches, RF attenuators, digital attenuators in a digital signal path, digital switches interrupting a digital signal in a digital signal path, etc.

Although FIG. 2 depicts the switching control module 210 as a separate module coupled to the downlink path 204 for illustrative purposes, other implementations are possible. In some aspects, the downlink path 204 may include one or more digital signal processing components, such as a processing device (e.g., an application-specific integrated circuit ("ASIC"), a field-programmable gate array ("FPGA"), etc.). The functions of the switching control module 210 can be performed by the processing device using digital downlink signals in the downlink path 204 between the interfaces 202, 208.

Figure 3:
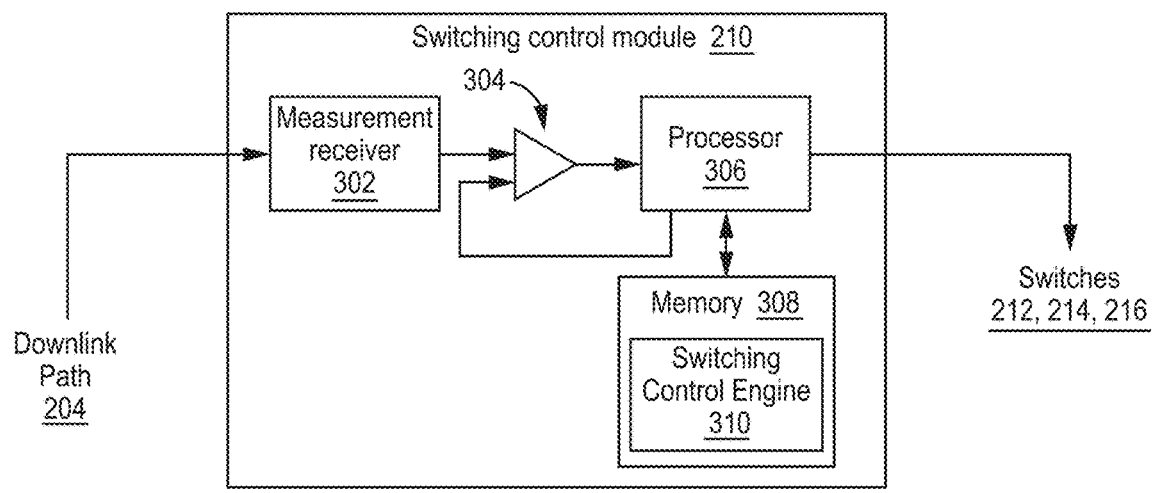
FIG. 3 is a block diagram of an example of a switching control module of the TDD switching sub-system of FIG. 2 according to an aspect of the present disclosure.

The switching control module 210 can provide switching signals based on a detection of downlink signals in the downlink path 204, an internal clock, or a combination thereof. For example, FIG. 3 is a block diagram depicting an example of the switching control module 210 according to an aspect of the present disclosure. The switching control module 210 can detect the downlink/uplink ratio of the base stations 101a, 101b or other signals sources. The switching control module 210 can determine an initial clock setting for the TDD switching sub-system based on the downlink/uplink ratio. The initial clock setting can determine the timing of sending switching signals to the switches 212, 214, 216. The switching control module 210 can optimize switching times for the switches 212, 214, 216. Optimizing the switching times can maximize or otherwise improve data throughput via the DAS 100.

The switching control module 210 can include a measurement receiver 302, a comparator 304, and a processor 306 communicatively coupled to a memory 308.

The measurement receiver 302 can include any suitable device for measuring a signal power level in the downlink path 204. A non-limiting example of a measurement receiver 302 is a power detector. For example, the measurement receiver can be a received signal strength indicator (RSSI) detector or the like. The measurement receiver 302 can be coupled to the downlink path 204 in any suitable manner, such as (but not limited to) a directional coupler.

The comparator 304 can include a first input coupled to an output of the measurement receiver 302 and a second input coupled to processor 306. The measurement receiver 302 can provide a voltage or current representative of a signal power measurement for the downlink path 204 to the first input of the comparator 304. The processor 306 can provide a voltage or current representative of a threshold signal power to the second input of the comparator 304. The comparator 304 can compare the representative voltages or currents for the downlink signal power measurement and the threshold signal power. The comparator 304 can output a voltage or current representative of whether the downlink signal power measurement exceeds the threshold signal power. The threshold signal power can be modified by modifying the voltage or current provided by the processor 306. In the example embodiment shown in FIG. 3, the threshold signal power provided to the comparator 304 is controlled by the processor 306. It should be understood that the threshold signal power can be provided directly by the processor 306 or the processor 306 can be configured to control a separate reference source device or circuit to provide the threshold signal power.

The processor 306 can receive the voltage or current representative of whether the downlink signal power measurement exceeds the threshold signal power. The processor 306 can control switching operations of the TDD switching sub-system 100 based on the comparison of the downlink signal power measurement and the threshold signal power by executing a switching control engine 310 or other executable instructions stored to the memory 308, as described in further detail below. The processor 306 can control the switching operations by generating switching signals that are provided to the switches 212, 214, 216 or the devices used for actuating the switches 212, 214, 216.

Although FIG. 3 depicts a switching control module 210 including a comparator 304 for outputting a signal indicative of whether the downlink signal power exceeds a threshold signal power, other implementations are possible. For example, in some aspects, the comparator 304 and the reference source 312 can be omitted, and the processor 306 can communicate with the measurement receiver 302 to obtain data describing signal power levels in the downlink path 204 and directly compare the output from the measurement receiver 302 to the threshold signal power. For example, the processor 306 can compare the data obtained from the measurement receiver 302 with data stored in the memory 308 that describes the threshold signal power, and the threshold signal power can be modified by providing updated data describing the threshold signal power to the processor 306 for storage in the memory 308. In such embodiments, the processor 306 produces the signal indicative of whether the downlink signal power exceeds a threshold signal power. In one non-limiting example the measurement receiver 302 can have an analog output electrically connected to the processor 306. The measurement receiver 302 can provide a voltage or a current to the processor 306 via the analog output. The voltage or current can be equivalent to or otherwise indicative of the measured power level in the downlink path 204. In another non-limiting example, the measurement receiver 302 can provide a digital output signal to the processor 306 that represents the measured power level in the downlink path 204. In additional or alternative aspects, the measurement receiver 302 can include a digital input that is coupled to the downlink path 204.

The processor 306 can include any device or group of devices suitable for accessing and executing executable instructions stored in the memory 308. Non-limiting examples of the processor 306 include a microprocessor, an ASIC, a FPGA, or other suitable processing device. The processor 306 may include one processor or any number of processors. The memory 308 may be any non-transitory computer-readable medium capable of tangibly embodying executable instructions and can include electronic, magnetic, or optical devices. Examples of memory 308 include random access memory ("RAM"), read-only memory ("ROM"), magnetic disk, an ASIC, a configured processor, or other storage device. Instructions can be stored in memory 308 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

At the time of installation, synchronization must be established prior to operation. A primary concern for establishing synchronization relates to the accurate detection of the entire downlink signal. Since the processor 306 uses the determination of whether the measured signal power exceeds the threshold signal when determining when to switch the switches 212, 214, 216, the threshold signal power input to the comparator 304 or used directly by the processor 306 is critical for proper synchronization for communication between the base station and user equipment for the TDD system. Typically, this threshold signal power is calibrated in the factory during production. However, the specific characteristics of the entire system are not known until installation of the system that includes the switching control module 210. For example, the particular characteristics (for example, signal power) of the downlink signal from the base station will be affected by other components of the system. It is likely that the factory calibration of the threshold signal power is not optimal to ensure synchronization in the field.

Figure 4B:
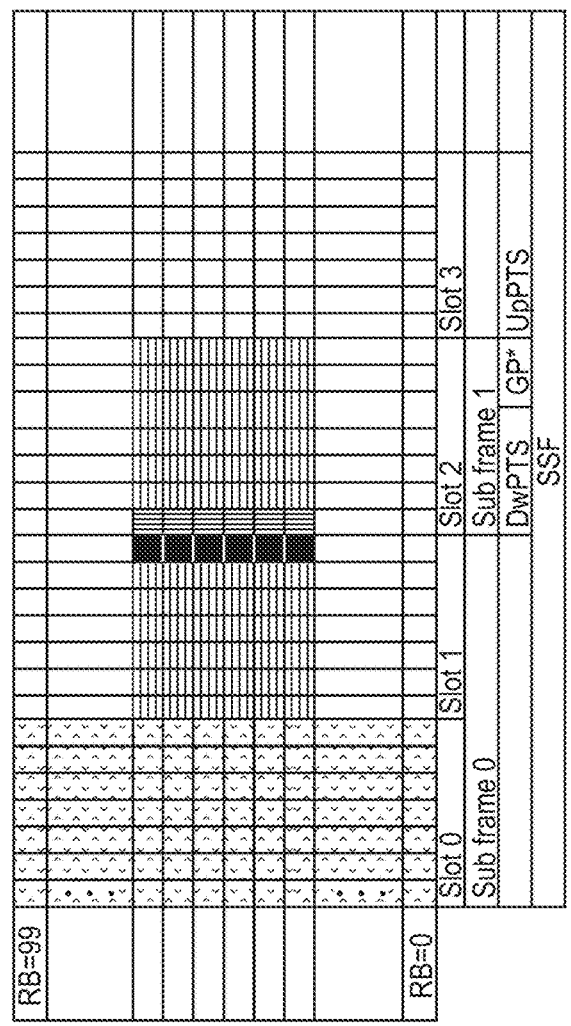
FIG. 4B is a diagram of an example configuration for subframes for a LTE TDD signal.

A particularly challenging situation for establishing synchronization occurs when portions of the downlink signal have reduced signal power compared to other portions of the downlink signal. A particular example of this occurs with Long-Term Evolution (LTE) TDD communication. FIG. 4A is a graph of different LTE TDD frame configurations and FIG. 4B illustrates the first two subframes of each of the LTE TDD frame configurations. As shown in FIG. 4A, when switching from a downlink subframe to an uplink subframe, there is a Special Sub Frame (SSF) in between to facilitate the switch. The SSF includes the Downlink Pilot Time Slot (DwPTS), a Guard Period (GP), and the Uplink Pilot Time Slot (UpPTS) and also has different configurations for the subframe. The DwPTS is part of the downlink signal and must be detected using the threshold signal power for proper synchronization.

As shown in FIG. 4B, the power level of the downlink signal at the end of the downlink subframe can be significantly lower than the power level of the downlink signal at the beginning of the downlink subframe. In the example shown in FIG. 4B, the LTE signal contains 100 resource blocks. Slot 1 and slot 2 of the LTE TDD signal in FIG. 4B include the Physical Broadcast Channel (PBCH) and the Primary Synchronization Signal (PSS) and Secondary Synchronization Signal (SSS), which are placed in six resource blocks. In other words, the power level of the symbols for the PBCH, PSS, and SSS is about 6% of the power level for the LTE TDD downlink signal. This means that the power level of the symbols for the PBCH, PSS, and SSS is about 12 dB lower than in symbols with all occupied resource blocks.

Figure 5A:
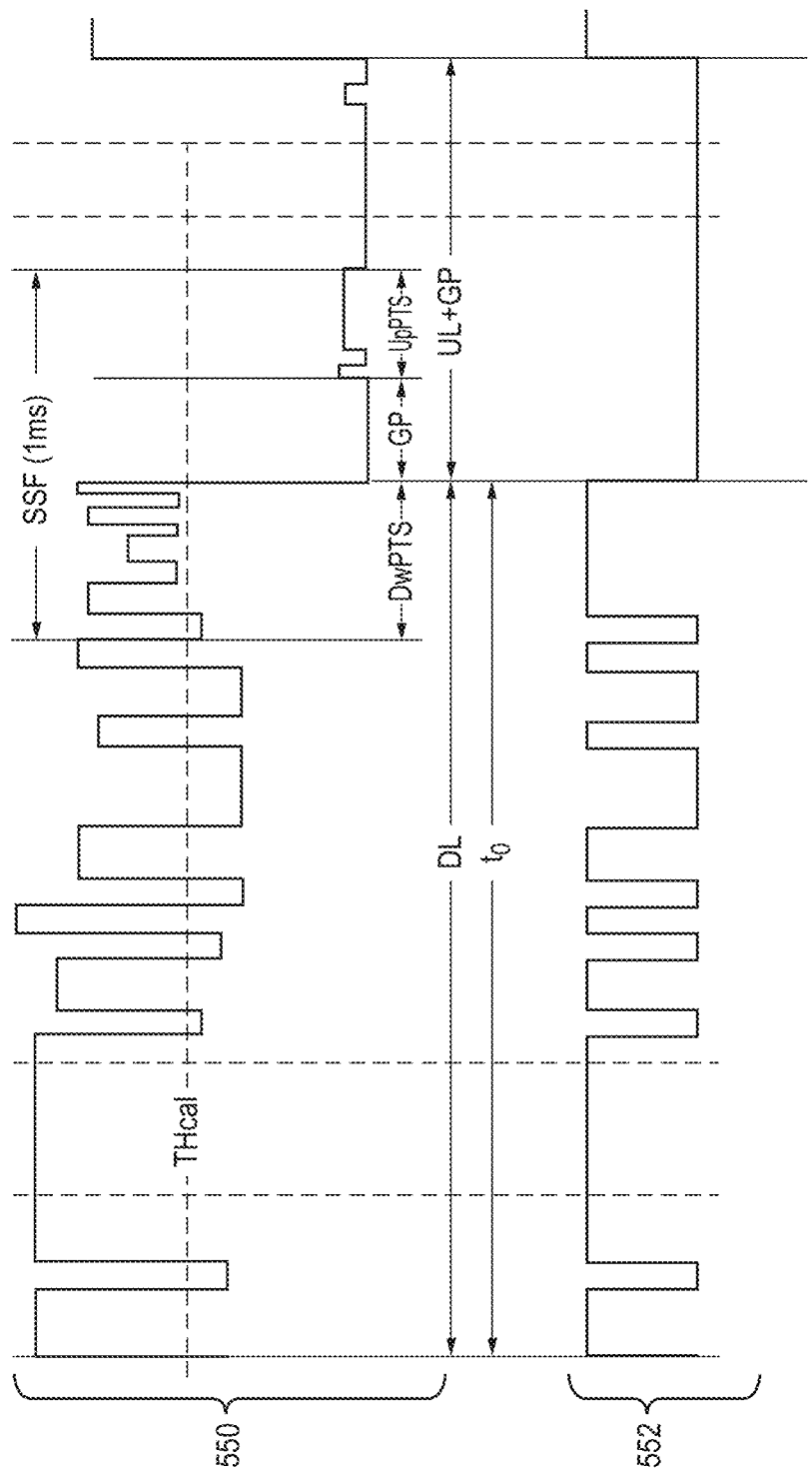
FIGS. 5A-5B are example graphs of a simplified LTE TDD signal and a signal output from a comparator of a switching control module of the TDD switching sub-system according to an aspect of the present disclosure.
Figure 5B:
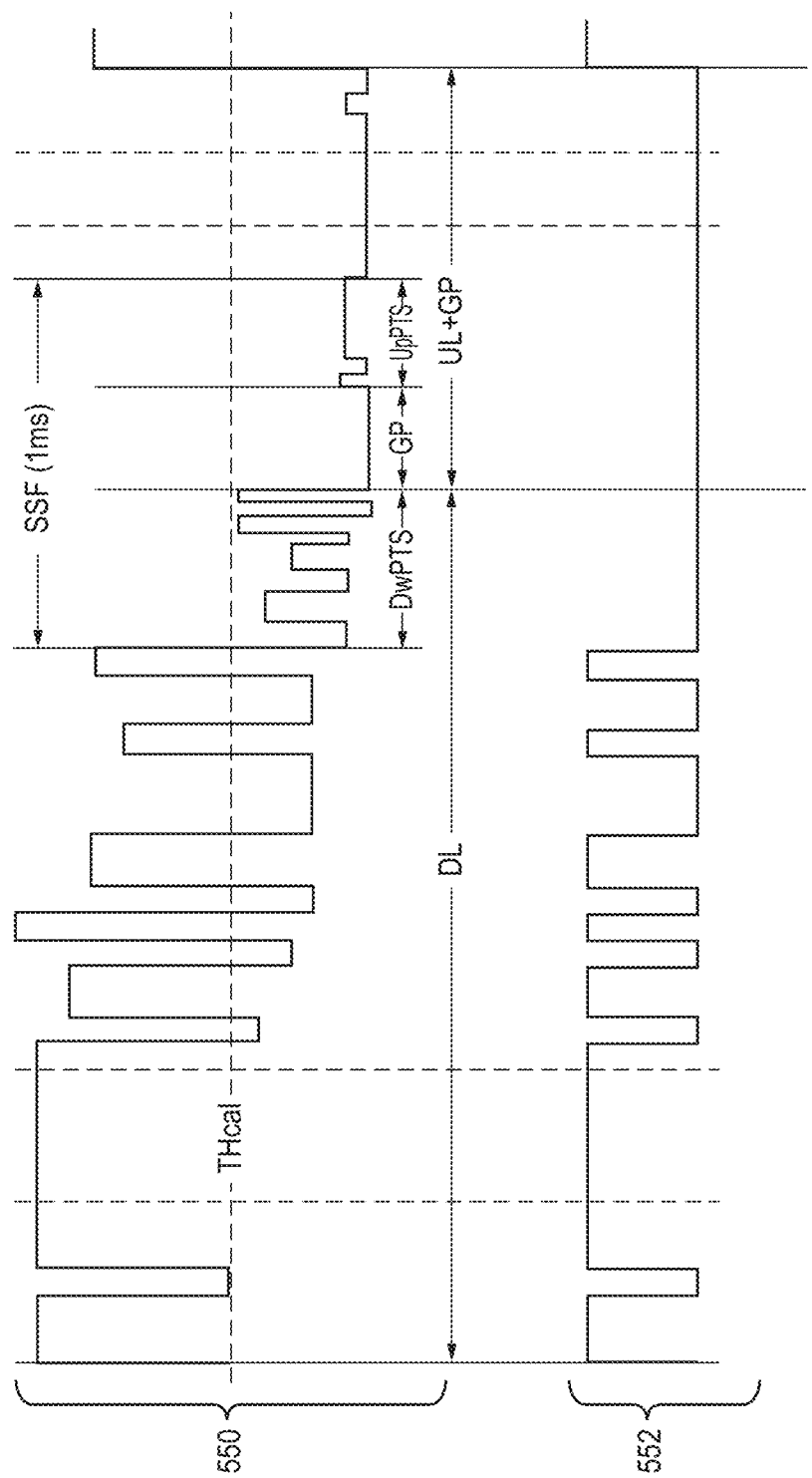

The effect of the lower power level for the PBCH, PSS, and SSS is that the comparator 304, and ultimately the processor 306, may miss these signal parts if the threshold signal power is not appropriately set. For example, this is shown in contrasting FIGS. 5A and 5B, which are example graphs of a simplified LTE TDD signal 550 and a signal 552 output from a comparator of a switching control module of the TDD switching sub-system. In FIG. 5A, the calibrated threshold signal power (THcal) is low enough to determine the actual downlink signal time (to) as none of the peaks of the downlink signal are missed. In FIG. 5B, the threshold signal power (THcal) is too high to detect the downlink signal at the end of the DwPTS. In order to avoid missing these signal parts, the TDD switching sub-system dynamically adjusts the threshold signal power during installation in an offline process as described below with respect to FIG. 6.

Figure 6:
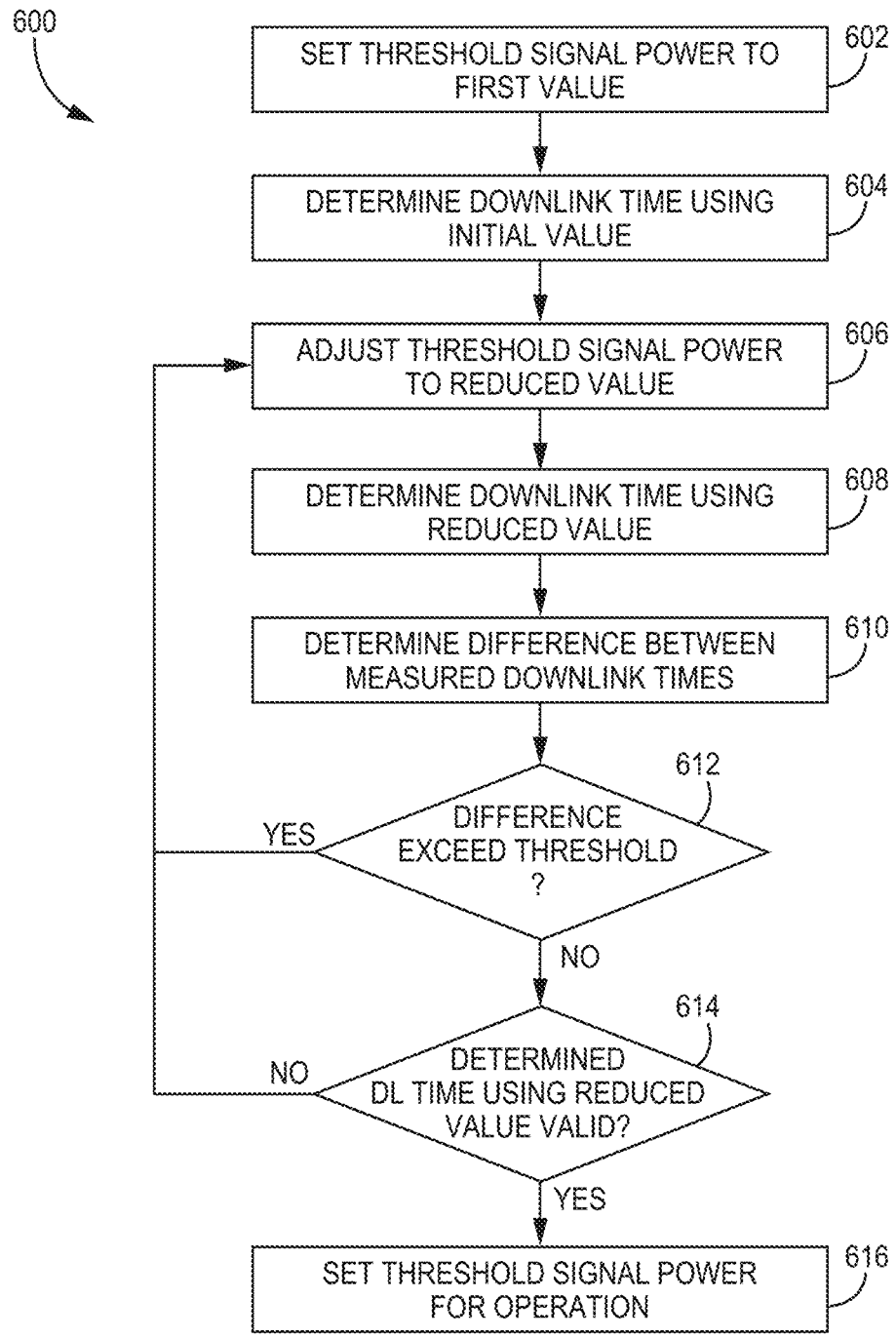
FIG. 6 is a flow chart of an example method for determining a threshold signal power for a switching control module of a TDD switching sub-system according to an aspect of the present disclosure.

FIG. 6 is a flow chart of an example method for determining a threshold signal power for the of the switching control module of the TDD switching sub-system according to an aspect of the present disclosure. The embodiment of method 600 shown in FIG. 6 is described here as being implemented using the switching control module of the TDD switching sub-system 210 of FIGS. 2-3, though it is to be understood that other embodiments can be implemented in other ways.

The DAS 100 is set to an offline mode for performing the method 600. For example, the DAS 100 may be automatically set to an initialization mode upon entering operation. An initialization or other offline mode can be used to set one or more system parameters of the DAS 100 used for TDD operation. In an offline mode, the switching control module 210 may perform one or more configuration operations based on signal power measurements in the downlink path 204 without controlling the switches 212, 214, 216. For example, in an offline mode, the switches 212, 214, 216 may be set to an open position such the DAS 100 does not communicate signals between the base stations 101a, 101b and the coverage areas 108a, 108b. Thus, no uplink signals are communicated during the offline mode because the user equipment in the coverage areas 108a, 108b cannot connect to the base stations 101a, 101b.

Figure 7B:
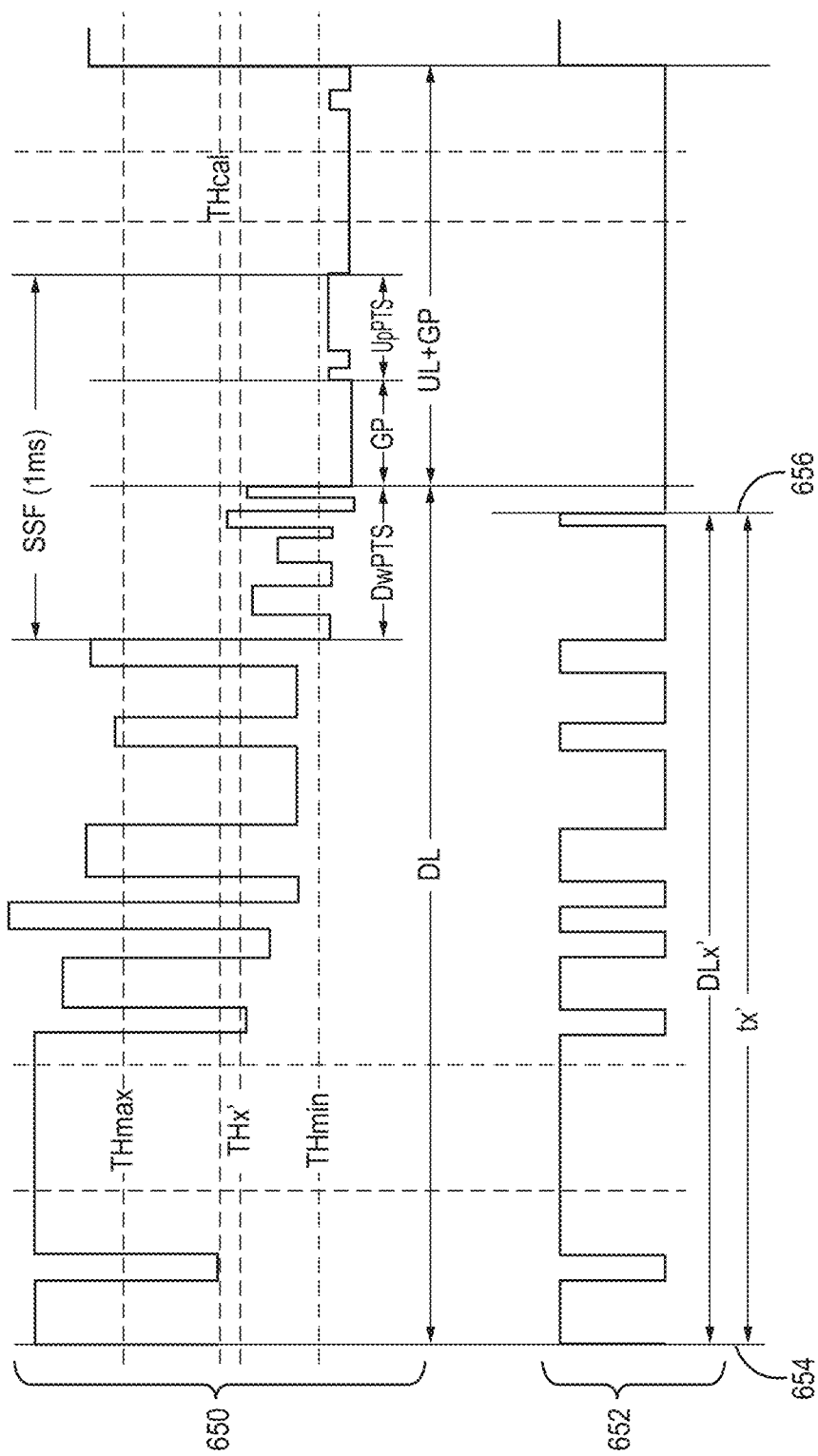
Figure 7C:
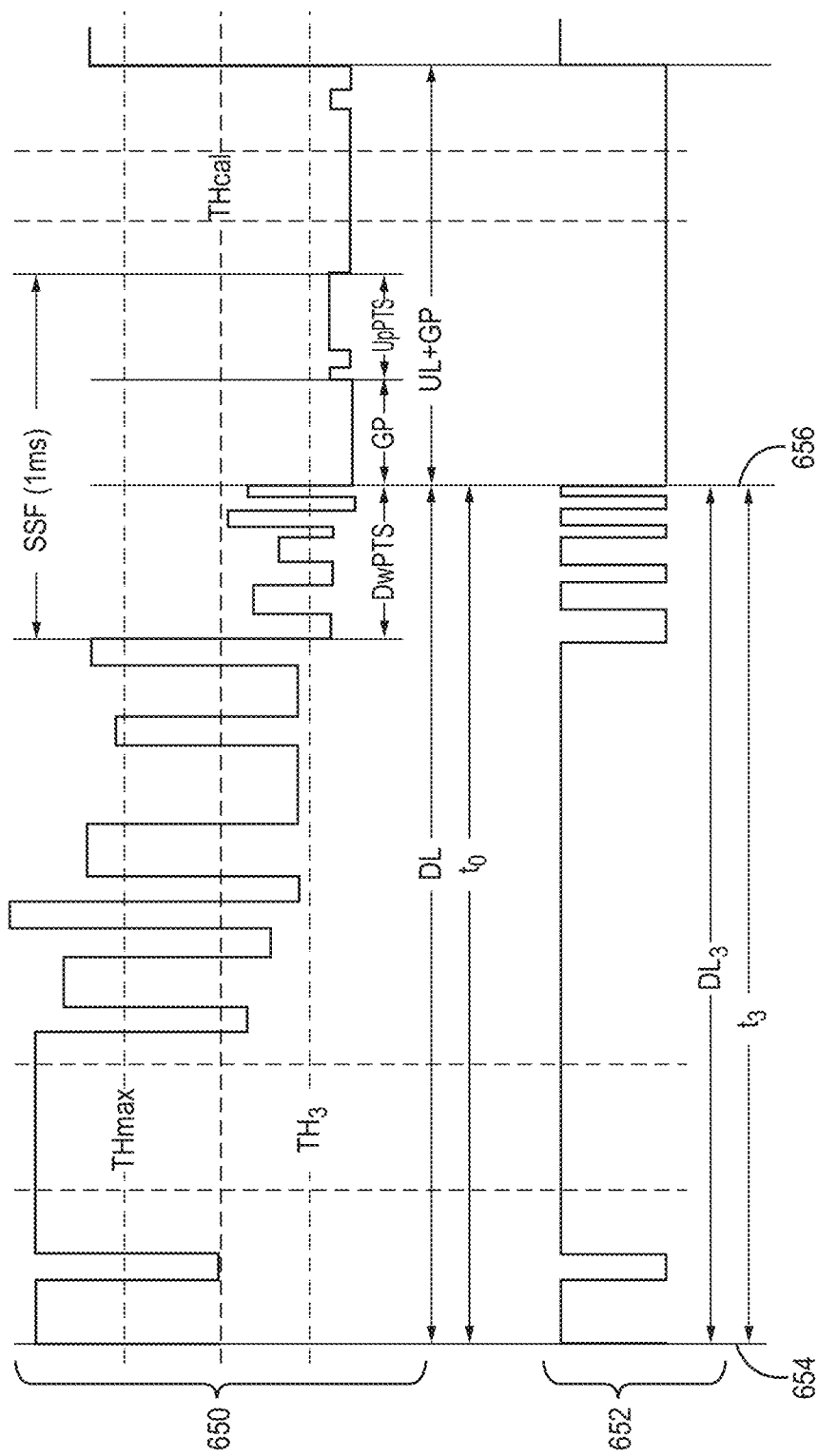

Method 600 includes setting a threshold signal power to a first value (block 602). As discussed above with respect to FIG. 3, the threshold signal power can be provided as an input to the comparator 304 or can be used directly by the processor 306. In exemplary embodiments, the first value of the threshold signal power is set to be a maximum value usable for the DAS. For example, for a LTE TDD signal, the maximum value of the threshold signal power (THmax) can correspond to a value that is just below the lowest power level of the high signals of the downlink signal in a downlink signal only subframe. This is shown in FIGS. 7A-7C, which are example graphs of a simplified LTE TDD signal 650 and an example signal 652 output from a comparator of a switching control module of the TDD switching sub-system. In other embodiments, the first value for the threshold signal power can be other values, such as, for example, the factory calibrated threshold signal power.

Method 600 further includes determining the downlink signal time using the first value of the threshold signal power (block 604). In exemplary embodiments, the determined downlink signal time corresponds to the time elapsed from when the downlink signal is first detected (shown as 654) to when the downlink is no longer detected (shown as 656). As discussed above with respect to FIG. 3, the downlink signal is first detected when the downlink signal power of the signal from the base station, which can provided to the comparator 304 or directly to the processor 306, exceeds the threshold signal power. In FIG. 7A, the threshold signal power (THmax) is too high to detect the downlink signal in the DwPTS, so the determined downlink signal time (ti) is shorter than the actual downlink signal time (to).

Method 600 further includes adjusting the threshold signal power to a reduced value (block 606). In exemplary embodiments, the threshold signal power is reduced by a predetermined fixed amount. For example, the threshold signal power can be reduced in 1 dB increments.

Method 600 further includes determining the downlink signal time using the reduced value of the threshold signal power (block 608). In exemplary embodiments, the downlink signal time using the reduced value of the threshold signal power is determined in a similar manner to that described above with respect to block 604. In FIG. 7B, the reduced threshold signal power (THx') is low enough to detect one of the peaks in the DwPTS, but not all of the peaks. Therefore, the downlink signal time (tx') determined using the reduced threshold signal power (THx') is also shorter than the actual downlink signal time ($t_0$).

Method 600 further includes determining a difference between the measured downlink signal times determined using the different values of the threshold signal power (block 610). In particular, for the first instance of the determination, the difference between the measured downlink time determined using the first value (shown as ti) of the threshold signal power and the measured downlink signal time determined using the reduced value of the threshold signal power (shown as tx') is determined.

Method 600 further includes determining whether the determined difference exceeds a threshold time (block 612). The threshold time is a predetermined, fixed value. If a determined downlink signal time is not correct, it can be assumed that at least one symbol was cut off. In other words, the determined downlink signal time is not correct if another downlink signal time was measured with a different offset time of more than one symbol, which is approximately 70 μs for LTE. Therefore, in exemplary embodiments, the threshold time is selected based on the duration of one symbol. In particular, the threshold time is selected to be less than the duration of one symbol by a desired offset. In the context of LTE, one symbol has a duration of approximately 70 μs, so the threshold time can be selected to be less than 70 μs. For example, the threshold time is set at approximately 60 μs for LTE signals.

When the determined difference exceeds the threshold time, method 600 proceeds with adjusting the threshold signal power to a further reduced value (block 606) and determining the downlink time using the further reduced value of the threshold signal power (block 608). Method 600 proceeds with determining the difference between the measured downlink signal times determined using the different values of the threshold signal power (block 610) and determining whether the difference exceeds the time threshold (612). The difference is determined for each iteration of the method steps and the two most recent measured downlink signal times are compared. The sequence can be repeated sequentially until the difference between the measured downlink signal times does not exceed the threshold.

When the determined difference does not exceed the threshold time, method 600 proceeds with determining whether the downlink signal time determined using the reduced value is valid (block 614). In exemplary embodiments, the determination is made by comparing the downlink signal time determined using the reduced value with known valid times for the system. TDD frame configurations have particular timing for downlink and uplink subframes and different downlink/uplink ratios for different TDD configurations. For LTE TDD signals, there is also particular timing for different configurations of the SSF for the DwPTS, GP, and UpPTS. Since the DwPTS is part of the downlink signal, the valid downlink signal times used for comparison include the total time for the downlink subframes and the DwPTS. In exemplary embodiments, the switching control engine 310 can access data describing the timing and different downlink/uplink ratios for different TDD configurations. In some aspects, the switching control engine 310 can select a TDD configuration based on a standardized downlink/uplink ratio in a telecommunication standard, such as a 3rd Generation Partnership Project ("3GPP") specification. Selecting the TDD configuration based on a standardized downlink/uplink ratio in a telecommunication standard can minimize or otherwise reduce errors with respect to incorrect switching intervals. If the downlink signal time determined using the reduced value matches a valid downlink time, then it is validated.

When the downlink signal time determined using the reduced value is not valid, method 600 proceeds with adjusting the threshold signal power to a further reduced value (block 606) and determining the downlink time using the further reduced value of the threshold signal power (block 608) similar to when the determined difference exceeds the threshold time as discussed above.

When the downlink signal time determined using the reduced value is valid, method 600 proceeds with setting the threshold signal power value for use during online operation of the switching control module (block 616). In exemplary embodiments, the threshold signal power is set at the reduced value used during the most recent iteration of method 600 (for example, the value used in block 608). In some embodiments, setting the threshold signal power includes reducing the threshold signal power by a fixed amount from the value used during the most recent iteration of method 600. Such embodiments provide a buffer for instances where the downlink signal power is reduced over time.

A certain level of isolation between the downlink signal power and the uplink signal power should be maintained for proper operation of a TDD switching sub-system. Since the processor 306 uses the determination of whether the measured signal power exceeds the threshold signal when determining when to switch the switches 212, 214, 216, there is also a minimum level for the threshold signal power (THmin), which corresponds to a level that is above the power level of the peaks of the uplink signals.

While method 600 has been described above with respect to setting the threshold signal power to a first value and successively reducing the threshold signal power until an optimal threshold signal power is identified, it should be understood that alternative methods can be implemented in similar ways. For example, in some embodiments, the first value of the threshold signal power can correspond to the minimum signal power necessary for isolation between the downlink and the uplink paths and the threshold signal power can be successively increased until an optimal threshold signal power is identified. In such embodiments, the method would continue until there was a reduction in the downlink signal time that exceeded a threshold similar to the threshold described above. In some aspects, optimal threshold signal power would provide additional isolation between the downlink and uplink signals while also detecting the entire downlink signal. In such aspects, it is assumed that the isolation can be increased. However, in certain implementations, it may not be possible to increase isolation in this manner and also detect the entire downlink signal.

Method 600 provides a more accurate determination of the threshold signal power compared to the calibrated threshold signal power based on estimation in the factory setting. In particular, the threshold signal power is calibrated to ensure detection of all components of the downlink signal for synchronizing the TDD switching sub-system with the TDD signals provided by the base stations.

Once the threshold signal power is set using the offline mode, the DAS 100 is switched to an online mode where signals are transmitted between the base stations 101a, 101b and user equipment in the coverage areas 108a, 108b. In operation, the base stations 101a, 101b provide downlink signals to a downlink path 204 and the measurement receiver 302 measures the power of the signals on the downlink path 204. The signal power in the downlink path 204 exceeding the threshold power can indicate that a downlink frame is being transmitted via the downlink path 204. The signal power in the downlink path 204 being less than or equal to the threshold power can indicate that a downlink frame is not being transmitted via the downlink path 204 and that an uplink frame is being transmitted via the uplink path 206. In operation, there may be slight discrepancies between the determined downlink signal time and the timing of the downlink signal provided by the base stations 101a, 101b. In some aspects, the discrepancies could be a result of some SSF configurations having the last portion of the DwPTS used for data channels only, which do not include synchronization signals. Thus, the duration of the downlink signal can be varied due to adding throughput to the downlink, which includes extending the duration with respect to the data load.

Figure 8:
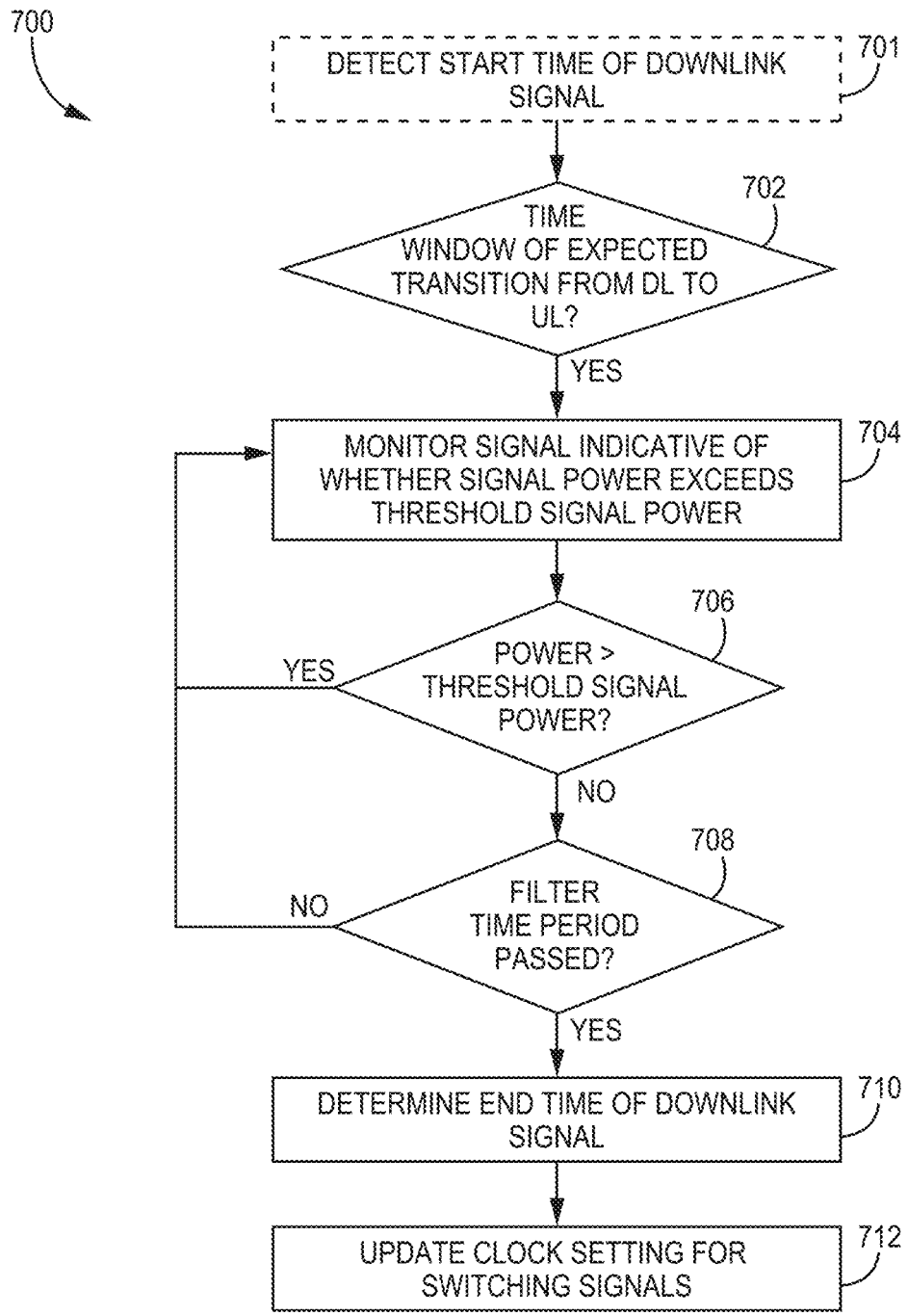
FIG. 8 is a flow chart of an example method for operating a switching control module of a TDD switching sub-system according to an aspect of the present disclosure

FIG. 8 is a flow chart of an example method 700 for operating the switching control module of the TDD switching sub-system according to an aspect of the present disclosure. The embodiment of method 700 shown in FIG. 8 is described here as being implemented using the switching control module of the TDD switching sub-system 210 of FIGS. 2-3, though it is to be understood that other embodiments can be implemented in other ways.

Method 700 optionally includes detecting a start time of the downlink signal (block 701). For example, the switching control engine 310 can receive or otherwise access data describing power measurements by the measurement receiver 302. The switching control engine 310 can detect the start time for a respective downlink signal based on a signal indicative of the signal power in the downlink path 204 exceeding the threshold signal power. Such a signal can be provided by a comparator 304 or directly from the processor 306 as discussed above.

Method 700 proceeds with determining whether a predetermined time window of an expected transition from a downlink signal to an uplink signal is reached (702). In exemplary embodiments, the predetermined time window is selected using an initial clock setting for the switching control module 210 based on the offline mode described above with respect to FIG. 6. For example, the determined downlink signal time identified using the set threshold signal power can be used for the initial clock setting. The start of the time window can correspond to a fixed period of time before the expected switching time based on the initial clock setting. The fixed period of time before the expected switching time is sufficient so the final transition from high to low when the downlink signal ends is detected. For example, the start of the time window can be approximately 60 µs prior to the expected switching time.

Essentially, the time window can be used to determine when the processor 306 begins looking for a transition from the downlink signal to the uplink signal. In exemplary embodiments, the processor 306 operation is interrupted until the time window is reached. In other words, the processor 306 does not listen to the output of the comparator 304 or output of the measurement receiver 302 until the time window is reached. By using the interrupt, transitions across the threshold signal power during the downlink subframe or uplink subframe (for example, extraneous power spikes when user equipment is close to the antenna) do not trigger an incorrect, early switch from the downlink to the uplink.

When the predetermined time window of an expected transition from a downlink signal to an uplink signal is reached, method 700 proceeds with monitoring a signal indicative of whether the power of the downlink signal on the downlink path exceeds a threshold (block 704). In exemplary embodiments, the power of the downlink signal is measured using a measurement receiver, such as measurement receiver 302, and the measured power signal is provided to a comparator, such as comparator 304. The comparator determines whether the measured power of the downlink signal exceeds the threshold signal power determined using the offline mode and outputs the signal indicative when the measured power of the downlink signal exceeds the threshold signal power. In other embodiments, the power of the downlink signal is provided directly to the processor 306 from the measurement receiver 302. In such embodiments, the processor determines whether the measured power of the downlink signal exceeds the threshold signal power determined using the offline mode and generates the signal indicative when the measured power of the downlink signal exceeds the threshold signal power.

When the measured power of the downlink signal on the downlink path exceeds the threshold signal power (for example, when a signal is received from the comparator), method 700 continues to monitor the signal indicative of whether the power of the downlink signal on the downlink path exceeds a threshold.

Since there may be gaps in the downlink signal, once the measured power of the downlink signal on the downlink path does not exceed the threshold signal power (for example, when a signal is not received from the comparator), method 700 proceeds with determining whether a filter time period has passed since the measured power of the downlink signal did not exceed the threshold signal power (708). In other words, method 700 waits for the filter time period to ensure that the end of the downlink signal has been detected rather than a gap in the downlink signal. In exemplary embodiments, the filter time period is a fixed, predetermined amount of time and is selected based on the duration of one symbol. In some embodiments, the filter time period is selected to be greater than the duration of one symbol by a desired offset. In the context of LTE, one symbol has a duration of approximately 70 μs, so the filter time period can be selected to be greater than 70 μs. For example, the filter time period can be set at approximately 80 μs for LTE signals. In other embodiments, the filter time period is selected to be less than the duration of one symbol by a desired offset. In the context of LTE, one symbol has a duration of approximately 70 μs, so the filter time period can be selected to be less than 70 μs. For example, the filter time period is set at approximately 60 μs for LTE signals.

When the filter time period has not passed, method 700 continues to monitor the signal indicative of whether the power of the downlink signal on the downlink path exceeds a threshold (block 704). If a signal indicating that the power of the downlink signal on the downlink path exceeds the threshold signal power is received or determined during the filter time period, then the process is reset and method 700 continues to monitor the signal indicative of whether the power of the downlink signal on the downlink path exceeds a threshold (block 704).

If a signal indicating that the power of the downlink signal on the downlink path exceeds the threshold signal power is not received or determined and the filter time period has passed, method 700 proceeds with determining an end time for the downlink signal (block 710). The switching control engine 310 can identify an end time for a respective downlink signal based on the time the power of the downlink signal on the downlink path dropped from a level exceeding the threshold signal power to a level below the threshold signal power.

Method 700 proceeds with updating the initial clock setting of the switching control module of the TDD switching sub-system based on the detected end time and/or the detected start time of the downlink signal (block 712). The clock setting of the switching control module of the TDD switching sub-system controls a timing for generating switching signals sent to the switches 212, 214, 216 or devices actuating the switches 212, 214, 216. The processor 306 provides switching signals to the switches 212, 214, 216 based on the updated clock setting.

In exemplary embodiments, method 700 can further include determining switching time differentials and using statistical analysis to identify switching time adjustments, as discussed in U.S. patent application Ser. No. 14/383,634, filed on Sep. 8, 2014, titled "Switching Sub-System for Distributed Antenna Systems Using Time Division Duplexing, which is incorporated herein by reference. For example, in some aspects, sampled values for switching time differentials can be obtained over different frames in which an operator using the DAS 100 switches between an uplink mode and a downlink mode. The switching control engine 310 can generate or otherwise obtain a statistical distribution of the sampled values for the switching time differentials and determine the switching time adjustment based on the statistical distribution. A non-limiting example of a switching time adjustment statistically determined from sampled values for the switching time differentials is a mean value of the sampled values of the switching time differentials.

Figure 9:
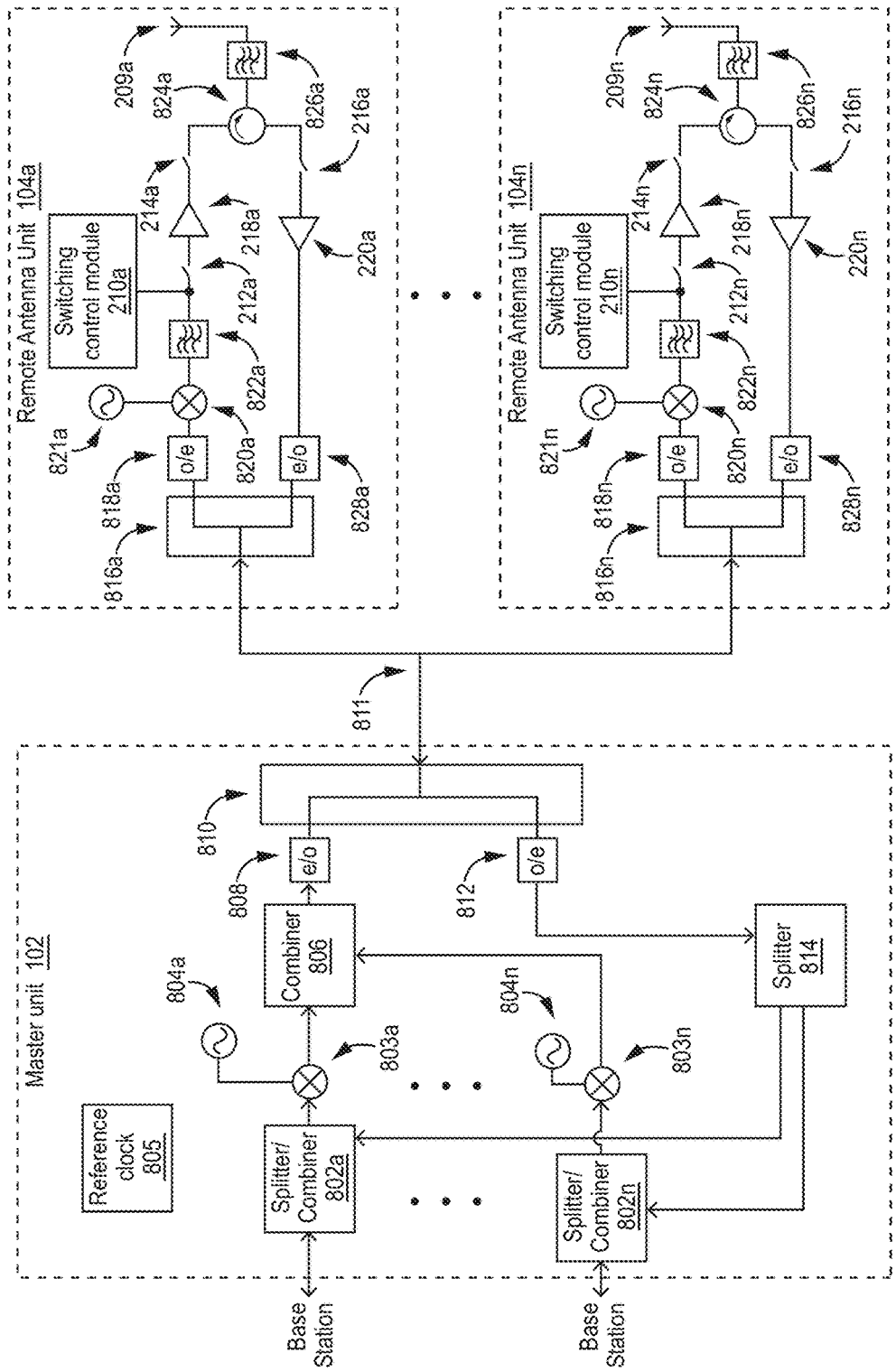
FIG. 9 is a schematic of examples of a master unit and remote antenna units for an optical TDD distributed antenna system utilizing the TDD switching sub-system according to an aspect of the present disclosure.

The TDD switching sub-system can be implemented in any suitable DAS 100 configured for TDD operations. For example, FIG. 9 is a schematic depicting examples of a master unit 102 and remote antenna units 104*a-n* for an optical TDD distributed antenna system that can utilize an optimized clock setting for a TDD switching sub-system according to an aspect of the present disclosure.

The master unit 102 can include splitter-combiners 802*a-n* for isolating uplink and downlink signals communicated with base stations or other signal sources. The master unit 102 can also include mixers 803*a-n* and local oscillators 804*a-n* for frequency-shifting downlink signals to intermediate frequency ("IF") bands, as described in greater detail below. The master unit 102 can also include a combiner 806 for combining downlink signals from different operators for serial transmission to remote antenna units 104*a-n*. The master unit 102 can also include an electrical-to-optical converter 808 for converting the serialized electrical downlink signals into serialized optical downlink signals. The serialized optical downlink signals can be transmitted to the remote antenna units 104*a-n* via the optical communication link 811. The master unit 102 can also include an optical-to-electrical converter 812 for converting optical uplink signals received via the optical communication link 811 into serialized electrical uplink signals. The master unit 102 can also include a splitter 814 for separating the serialized electrical uplink signals into separate uplink signals for transmission to base stations or other receivers of uplink signals.

The remote antenna units 104*a-n* can include respective optical splitter-combiners 816*a-n* for isolating optical downlink signals from optical uplink signals. The remote antenna units 104*a-n* can also include respective optical-to-electrical converters 818*a-n* for converting optical downlink signals into electrical downlink signals. The remote antenna units 104*a-n* can also include respective mixers 820*a-n* and local oscillators 821*a-n* for frequency shifting downlink signals to RF frequency bands, as described in detail below. The remote antenna units 104*a-n* can also include respective bandpass filters 822*a-n* for attenuating unwanted frequency components of the RF downlink signals outputted by the mixers 820*a-n*. The remote antenna units 104*a-n* can also include switching control modules 210*a-n* and switches 212*a-n*, 214*a-n*, 216*a-n* that perform the same or similar functions with respect to the power amplifiers 218*a-n* and low noise amplifiers 220*a-n* as described above with respect to FIG. 2. The remote antenna units 104*a-n* can also include respective circulators 824*a-n* for coupling downlink signals from the downlink paths to the antennas 209*a-n* and for coupling uplink signals from the antennas 209*a-n* to the uplink paths. The remote antenna units 104*a-n* can also include respective electrical-to-optical converters 828*a*—for converting electrical uplink signals to optical uplink signals for transmission via the optical communication link 811.

Multiple telecommunication operators utilizing the DAS 100 can use a common optical communication link 811 between the master unit 102 and the remote antenna units 104*a-n*. In some aspects, the DAS 100 can support an "uncoordinated operator mode." In the uncoordinated operator mode, different operators using the DAS 100 do not coordinate with one another in switching between an uplink TDD mode and a downlink TDD mode.

The DAS 100 can be configured to reduce or eliminate uplink blocking by unsynchronized operators transmitting signals using adjacent frequencies. For example, downlink signals from multiple operators can be closely spaced within a frequency band (e.g., a few MHz). The mixers 803a-n and the local oscillators 804a-n of the master unit 102 can be used to frequency-shift downlink signals to IF bands. Frequency shifting the downlink signals to IF bands can separate downlink signals from uncoordinated operators use closely spaced frequencies for transmitting TDD signals. The mixers 820a-n and local oscillators 821a-n of the remote antenna units 104a-n can be used to frequency-shift the IF downlink signals back to RF bands for transmission. A reference clock 805 in the master unit 102 can be used for synchronizing the local oscillators 804a-n, 821a-n. In some aspects, the reference clock 805 can also be used for synchronizing the threshold signal power used by the switching control module 210. The reference clock 805 can be communicatively coupled to the local oscillators 804a-n via any suitable mechanism, such as a printed circuit board or other communication bus (not depicted in FIG. 9). Signals from the reference clock 805 can be communicated from the master unit 102 to the remote antenna units 104a-n via the optical communication link 811.

Figure 10:
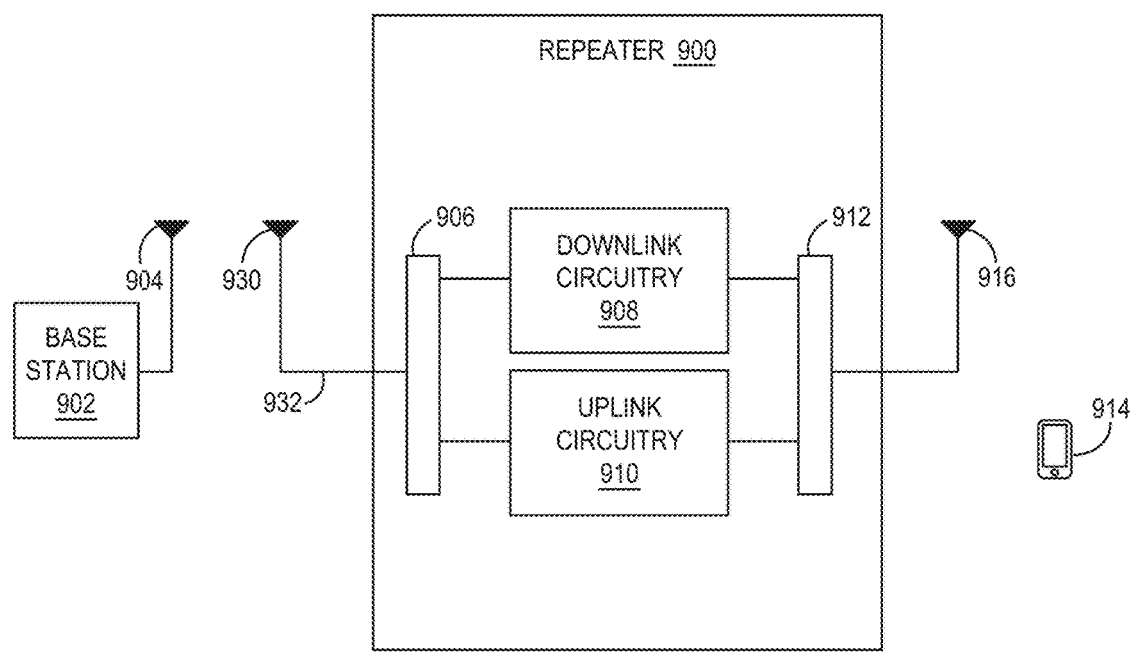
FIG. 10 is a schematic of an example single-node repeater system utilizing the TDD switching sub-system according to an aspect of the present disclosure.

The TDD switching sub-system can be implemented in any suitable single-node repeater configured for TDD operations. FIG. 10 illustrates one exemplary embodiment of a single-node repeater 900 in which the TDD synchronization techniques described here can be implemented.

In the exemplary embodiment shown in FIG. 10, the single-node repeater 900 is coupled to one or more base stations 902 using a donor antenna 930.

The single-node repeater 900 comprises a first duplexer 906 having a common port that is coupled to the donor antenna 930 via a cable 932, a downlink port that is coupled to downlink circuitry 908, and an uplink port that is coupled to uplink circuitry 910. The single-node repeater 900 comprises a second duplexer 912 having a common port that is coupled to the coverage antenna 914, a downlink port that is coupled to the downlink circuitry 908, and an uplink port that is coupled to the uplink circuitry 910.

In general, the single-node repeater 900 is configured to receive one or more downlink signals from one or more base stations 902. Each base station downlink signal includes one or more radio frequency channels used for communicating in the downlink direction with user equipment 914 over the relevant one or more wireless air interfaces. The downlink circuitry 908 is configured to amplify the downlink signals received at the repeater 900 and re-radiate the amplified downlink signals via the coverage antenna 916. As a part of doing this, the downlink circuitry 908 can be configured to filter the downlink signals to separate out the individual channels, individually amplify each filtered downlink channel signal, combine the individually amplified downlink channel signals, and re-radiate the resulting combined signal.

Similar processing is performed in the uplink. The single-node repeater 900 is configured to receive one or more uplink signals from user equipment 914. Each user equipment uplink signal includes one or more radio frequency channels used for communicating in the uplink direction with one or more base stations 902 over the relevant one or more wireless air interfaces. The uplink circuitry 910 is configured to amplify the uplink signals received at the repeater 900 and re-radiate the amplified uplink signals via the donor antenna 904. As a part of doing this, the uplink circuitry 910 can be configured to filter the uplink signals to separate out the individual channels, individually amplify each filtered uplink channel signal, combine the individually amplified uplink channel signals, and re-radiate the resulting combined signal.

The single-node repeater 900 can be configured to implement one or more features to provide sufficient isolation between the donor antenna 904 and the coverage antenna 914. These features can include gain control circuitry and adaptive cancellation circuitry. Other features can be implemented. These features can be implemented in one or more of the downlink circuitry 908 and/or the uplink circuitry 910. These features can also be implemented in separate circuitry.

The various circuitry and features of the single-node repeater 900 can be implemented in analog circuitry, digital circuitry, or combinations of analog circuitry and digital circuitry. The downlink circuitry 908 and uplink circuitry 910 can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink circuitry 908 and uplink circuitry 910 may share common circuitry and/or components.

In this embodiment, the signal node repeater 900 is configured to repeat time-division duplexing (TDD) signals. The downlink circuitry 908 and the uplink circuitry 910 includes one or more switches that are switched in order to either couple or isolate the output and/or input of that circuitry to or from corresponding ports of the duplexers 906 and 912. The techniques described above for determining the threshold signal power and TDD synchronization timing can be used in such a repeater 900. In exemplary embodiments, the repeater 900 includes a switching control module and TDD switching sub-system similar to those described above.

Example Embodiments

Example 1 includes a method for determining threshold signal power for a switching control module of a time-division-duplexing (TDD) switching sub-system comprising: setting a threshold signal power to a first value, wherein the threshold signal power is compared to a measured signal power of a downlink signal of a downlink path of a telecommunication system from a measurement receiver; determining a first downlink signal time using the first value; adjusting the threshold signal power to a second value; determining a second downlink signal time using the second value; determining a difference between the first downlink signal time and the second downlink signal time; when the difference between the first downlink signal time and the second downlink signal time does not exceed a predetermined threshold time, determining whether the second downlink signal time corresponds to a valid downlink signal time; when the second downlink signal time corresponds to a valid downlink signal time, setting a fixed threshold signal power for use during online operation of the switching control module.

Example 2 includes the method of Example 1, wherein determining the first downlink signal time includes determining a start time and an end time for respective downlink subframes transmitted via the downlink path, wherein each start time or end time is determined based on whether the measured signal power exceeds the threshold signal power.

Example 3 includes the method of any of Examples 1-2, wherein the threshold time corresponds to a predetermined time period based on a length of one symbol.

Example 4 includes the method of any of Examples 1-3, wherein when the difference between the first downlink signal time and the second downlink signal time exceeds the threshold, the method further comprises: adjusting the threshold signal power to a third value; determining a third downlink signal time using the third value; determining a difference between the second downlink signal time and the third downlink signal time; when the difference between the second downlink signal time and the third downlink signal time does not exceed a threshold, determining whether the third downlink signal time corresponds to a valid downlink signal time; when the third downlink signal time corresponds to a valid downlink signal time, setting a fixed threshold signal power for use during an online mode of the switching control module.

Example 5 includes the method of any of Examples 1-4, wherein adjusting the threshold signal power comprises reducing the threshold signal power by a fixed amount.

Example 6 includes the method of any of Examples 1-5, wherein adjusting the threshold signal power comprises increasing the threshold signal power by a fixed amount.

Example 7 includes the method of any of Examples 1-6, wherein the TDD switching sub-system is included in a remote unit of a distributed antenna system (DAS), the method further comprising switching at least one switch of the downlink path of the remote unit of the DAS and at least one switch of an uplink path of the remote unit of the DAS in the online mode of operation using the fixed threshold signal power.

Example 8 includes the method of any of Examples 1-7, wherein the TDD switching sub-system is included in a single-node repeater, the method further comprising switching at least one switch of a downlink path of the single-node repeater and at least one switch of an uplink path of the single-node repeater in the online mode of operation using the fixed threshold signal power.

Example 9 includes the method of any of Examples 1-8, wherein the threshold signal power is provided to a comparator, wherein the comparator compares the threshold signal power to the measured signal power of the downlink signal of the downlink path of the telecommunication system from the measurement receiver and provides a signal to the at least one processor that is indicative of whether the power measurement exceeds the threshold signal power.

Example 10 includes a switching control module comprising: a measurement receiver configured for measuring a signal power of a downlink signal in a downlink path of a telecommunication system; at least one processor communicatively configured to: set the threshold signal power to a first value; determine a first downlink signal time using the first value; adjust the threshold signal power to a second value; determine a second downlink signal time using the second value; determine a difference between the first downlink signal time and the second downlink signal time; when the difference between the first downlink signal time and the second downlink signal time does not exceed a threshold time, determine whether the second downlink signal time corresponds to a valid downlink signal time; when the second downlink signal time corresponds to a valid downlink signal time, set the threshold signal power for use during online operation of the switching control module.

Example 11 includes the switching control module of Example 10, wherein the at least one processor is configured to determine the first downlink signal time by determining a start time and an end time for respective downlink subframes transmitted via the downlink path, wherein each start time or end time is determined based on whether the measured signal power exceeding the threshold signal power.

Example 12 includes the switching control module of any of Examples 10-11, wherein the threshold time corresponds to a predetermined time period based on a length of one symbol.

Example 13 includes the switching control module of any of Examples 10-12, wherein when the difference between the first downlink signal time and the second downlink signal time exceeds the threshold, the at least one processor is further configured to: adjust the threshold signal power to a third value; determine a third downlink signal time using the third value; determine a difference between the second downlink signal time and the third downlink signal time; when the difference between the second downlink signal time and the third downlink signal time does not exceed a threshold, determine whether the third downlink signal time corresponds to a valid downlink signal time; when the third downlink signal time corresponds to a valid downlink signal time, set the threshold signal power for use during an online mode of the switching control module.

Example 14 includes the switching control module of any of Examples 10-13, wherein the at least one processor is configured to adjust the threshold signal power by reducing the threshold signal power by a fixed amount.

Example 15 includes the switching control module of any of Examples 10-14, wherein the at least one processor is configured to adjust the threshold signal power by increasing the threshold signal power by a fixed amount.

Example 16 includes the switching control module of any of Examples 10-15, wherein the switching control module is included in a remote unit of a distributed antenna system (DAS), wherein the at least one processor is further configured to switch at least one switch of the downlink path of the remote unit of the DAS and at least one switch of an uplink path of the remote unit of the DAS in the online mode of operation using the fixed threshold signal power.

Example 17 includes the switching control module of any of Examples 10-16, wherein the switching control module is included in a single-node repeater, wherein the at least one processor is further configured to switch at least one switch of the downlink path of the single-node repeater and at least one switch of an uplink path of the single-node repeater in the online mode of operation using the fixed threshold signal power.

Example 18 includes the switching control module of any of Examples 10-17, further comprising a comparator having an input communicatively coupled to the measurement receiver and an output communicatively coupled to the at least one processor, wherein the comparator is configured to compare the threshold signal power with the measured signal power of the downlink signal received from the measurement receiver via the input, wherein the comparator is configured to provide a signal that is indicative of whether the measured signal power exceeds the threshold signal power to the at least one processor via the output.

Example 19 includes a time division duplex (TDD) switching sub-system disposed in a remote unit of a telecommunication system, the TDD switching sub-system comprising: at least one first switch positioned in a downlink path from a base station to an antenna of the remote unit, the at least one first switch configured for selectively connecting the antenna to the downlink path; at least one second switch positioned in an uplink path from the antenna to the base station, the at least one second switch configured for selectively connecting the antenna to the uplink path; a measurement receiver configured for measuring a signal power in the downlink path; at least one processor configured to: set a threshold signal power to a first value, wherein the signal power in the downlink path is compared to the threshold signal power; determine a first downlink signal time using the first value; adjust the threshold signal power to a second value; determine a second downlink signal time using the second value; determine a difference between the first downlink signal time and the second downlink signal time; when the difference between the first downlink signal time and the second downlink signal time does not exceed a threshold time, determine whether the second downlink signal time corresponds to a valid downlink signal time; when the second downlink signal time corresponds to a valid downlink signal time, set the threshold signal power for use during an online mode of the switching control module.

Example 20 includes the TDD switching sub-system of Example 19, wherein the at least one processor is configured to determine the first downlink signal time by determining a start time and an end time for respective downlink sub-frames transmitted via the downlink path, wherein each start time or end time is determined based on whether the measured signal power exceeding the threshold signal power.

Example 21 includes the TDD switching sub-system of any of Examples 19-20, wherein the threshold time corresponds to a predetermined time period based on a length of one symbol.

Example 22 includes the TDD switching sub-system of any of Examples 19-21, wherein when the difference between the first downlink signal time and the second downlink signal time exceeds the threshold, the at least one processor is further configured to: adjust the threshold signal power to a third value; determine a third downlink signal time using the third value; determine a difference between the second downlink signal time and the third downlink signal time; when the difference between the second downlink signal time and the third downlink signal time does not exceed a threshold, determine whether the third downlink signal time corresponds to a valid downlink signal time; when the third downlink signal time corresponds to a valid downlink signal time, set the threshold signal power for use during an online mode of the switching control module.

Example 23 includes the TDD switching sub-system of any of Examples 19-22, wherein the at least one processor is configured to adjust the threshold signal power by reducing the threshold signal power by a fixed amount.

Example 24 includes the TDD switching sub-system of any of Examples 19-23, wherein the at least one processor is configured to adjust the threshold signal power by increasing the threshold signal power by a fixed amount.

Example 25 includes the TDD switching sub-system of any of Examples 19-24, wherein the remote unit comprises a remote antenna unit of a distributed antenna system (DAS), wherein the at least one processor is further configured to switch the at least one first switch of the downlink path of the remote unit of the DAS and the at least one second switch of the uplink path of the remote unit of the DAS in the online mode of operation using the fixed threshold signal power.

Example 26 includes the TDD switching sub-system of any of Examples 19-25, wherein the remote unit comprises a single-node repeater, wherein the at least one processor is further configured to switch the at least one first switch of the downlink path of the single-node repeater and the at least one second switch of the uplink path of the single-node repeater in the online mode of operation using the fixed threshold signal power.

Example 27 includes the TDD switching sub-system of any of Examples 19-26, further comprising a comparator having an input communicatively coupled to the measurement receiver and an output communicatively coupled to the at least one processor, wherein the comparator is configured to compare the threshold signal power with the measured signal power of the downlink signal received from the measurement receiver via the input, wherein the comparator is configured to provide a signal that is indicative of whether the measured signal power exceeds the threshold signal power to the at least one processor via the output.

Example 28 includes a method for operating a switching control module of a time-division-duplexing (TDD) switching sub-system comprising: determining whether a current clock time is within a predetermined time window of an expected transition from a downlink signal to an uplink signal, wherein the expected transition from the downlink signal to the uplink signal is based on a clock setting; when the clock time is within the predetermined time window of an expected transition from the downlink signal to the uplink signal, monitoring a signal indicative of whether a measured signal power of the downlink signal on a downlink path exceeds a threshold signal power; when the signal indicates that the measured signal power of the downlink signal does not exceed the threshold signal power, determining whether a filter time period has passed without the signal indicating that the measured signal power of the downlink signal exceeds the threshold signal power; when the filter time period has passed without the signal indicating that the measured signal power of the downlink signal exceeds the threshold signal power, determine an end time of the downlink signal; and updating the clock setting based on the determined end time of the downlink signal.

Example 29 includes the method of Example 28, further comprising: measuring a power of the downlink signal on the downlink path using a measurement receiver; and comparing the measured power of the downlink signal on the downlink path to the threshold signal power using a comparator, wherein the signal indicative of whether a power of the downlink signal on the downlink path exceeds the threshold signal power is output from the comparator.

Example 30 includes the method of any of Examples 28-29, wherein the predetermined time window is a fixed time from an expected time for the expected transition from the downlink signal to the uplink signal.

Example 31 includes the method of any of Examples 28-30, wherein the filter time period is based on a length of one symbol.

Example 32 includes the method of any of Examples 28-31, wherein the TDD switching sub-system is included in a remote antenna unit of a distributed antenna system (DAS), the method comprising disconnecting the antenna from the downlink path in the remote antenna unit of the DAS by switching at least one switch of the downlink path in the remote antenna unit of the DAS and communicatively coupling the antenna to an uplink path in the remote antenna unit of the DAS by switching at least one switch of the uplink path in the remote antenna unit of the DAS.

Example 33 includes the method of any of Examples 28-32, wherein the TDD switching sub-system is included in a single-node repeater, the method comprising disconnecting the antenna from the downlink path of the single-node repeater by switching at least one switch of the downlink path single-node repeater and communicatively coupling the antenna to an uplink path single-node repeater by switching at least one switch of the uplink path single-node repeater.

Example 34 includes the method of any of Examples 28-33, further comprising determining a start time of the downlink signal and updating the clock setting based on the determined start time of the downlink signal.

Example 35 includes a switching control module comprising: a measurement receiver configured for measuring a signal power of a downlink signal in a downlink path of a telecommunication system; at least one processor configured to: determine whether a current clock time is within a predetermined time window of an expected transition from a downlink signal to an uplink signal, wherein the expected transition from the downlink signal to the uplink signal is based on a clock setting; when the clock time is within the predetermined time window of an expected transition from the downlink signal to the uplink signal, monitor a signal that is indicative of whether the measured signal power of the downlink signal on the downlink path exceeds the threshold signal power; when the signal indicates that the measured signal power of the downlink signal does not exceed the threshold signal power, determine whether a filter time period has passed without the signal indicating that the measured signal power of the downlink signal exceeds the threshold signal power; and when the filter time period has passed without the signal indicating that the measured signal power of the downlink signal exceeds the threshold signal power, determine an end time of the downlink signal; and update the clock setting based on the determined end time of the downlink signal.

Example 36 includes the switching control module of Example 35, further comprising a comparator having an input communicatively coupled to the measurement receiver and an output communicatively coupled to the at least one processor, wherein the comparator is configured to compare the threshold signal power with the measured signal power of the downlink signal received from the measurement receiver via the input, wherein the comparator is configured to provide the signal that is indicative of whether the measured signal power exceeds the threshold signal power to the at least one processor via the output.

Example 37 includes the switching control module of any of Examples 35-36, wherein the at least one processor receives the measured signal power from the measurement receiver, wherein the at least one processor is configured to compare the threshold signal power with the measured signal power of the downlink signal received from the measurement receiver, wherein the at least one processor is configured to generate the signal that is indicative of whether the measured signal power of the downlink signal on the downlink path exceeds the threshold signal power.

Example 38 includes the switching control module of any of Examples 35-37, wherein the predetermined time window is fixed time from the expected time for the transition from the downlink signal to the uplink signal.

Example 39 includes the switching control module of any of Examples 35-38, wherein the filter time period is based on a length of one symbol.

Example 40 includes the switching control module of any of Examples 35-39, wherein the switching control module is included in a remote antenna unit of a distributed antenna system (DAS), wherein the at least one processor is configured to disconnect the antenna from the downlink path in the remote antenna unit of the DAS by switching at least one switch of the downlink path in the remote antenna unit of the DAS and communicatively couple the antenna to an uplink path in the remote antenna unit of the DAS by switching at least one switch of the uplink path in the remote antenna unit of the DAS.

Example 41 includes the switching control module of any of Examples 35-40, wherein the switching control module is included in a single-node repeater, wherein the at least one processor is configured to disconnect the antenna from the downlink path of the single-node repeater by switching at least one switch of the downlink path single-node repeater and communicatively couple the antenna to an uplink path single-node repeater by switching at least one switch of the uplink path single-node repeater.

Example 42 includes the switching control module of any of Examples 35-41, wherein the at least one processor is further configured to determine a start time of the downlink signal and update the clock setting based on the determined start time of the downlink signal.

Example 43 includes a time division duplex (TDD) switching sub-system disposed in a remote unit of a telecommunication system, the TDD switching sub-system comprising: at least one first switch positioned in a downlink path from a base station to an antenna of the remote unit, the at least one first switch configured for selectively connecting the antenna to the downlink path; at least one second switch positioned in an uplink path from the antenna to the base station, the at least one second switch configured for selectively connecting the antenna to the uplink path; a measurement receiver configured for measuring a signal power in the downlink path; at least one processor configured to: determine whether a current clock time is within a predetermined time window of an expected transition from a downlink signal to an uplink signal, wherein the expected transition from the downlink signal to the uplink signal is based on a clock setting; when the clock time is within the predetermined time window of an expected transition from the downlink signal to the uplink signal, monitor a output that is indicative of whether the measured signal power of the downlink signal on a downlink path exceeds the threshold signal power; when the signal indicates that the measured signal power of the downlink signal does not exceed the threshold signal power, determine whether a filter time period has passed without the signal indicating that the measured signal power of the downlink signal exceeds the threshold signal power; and when the filter time period has passed without the signal indicating that the measured signal power of the downlink signal exceeds the threshold signal power, determine an end time of the downlink signal; and update the clock setting based on the determined end time of the downlink signal.

Example 44 includes the TDD switching sub-system of Example 43, further comprising a comparator having an input communicatively coupled to the measurement receiver and an output communicatively coupled to the at least one processor, wherein the comparator is configured to compare the threshold signal power with the measured signal power received from the measurement receiver via the input and provide the signal that is indicative of whether the power measurement exceeds the threshold signal power to the at least one processor via the output.

Example 45 includes the TDD switching sub-system of any of Examples 43-44, wherein the at least one processor receives the measured signal power from the measurement receiver, wherein the at least one processor is configured to compare the threshold signal power with the measured signal power of the downlink signal received from the measurement receiver, wherein the at least one processor is configured to generate the signal that is indicative of whether the measured signal power of the downlink signal on the downlink path exceeds the threshold signal power.

Example 46 includes the TDD switching sub-system of any of Examples 43-45, wherein the predetermined time window is a fixed time from the expected time for the transition from the downlink signal to the uplink signal.

Example 47 includes the TDD switching sub-system of any of Examples 43-46, wherein the filter time period is based on a length of one symbol.

Example 48 includes the TDD switching sub-system of any of Examples 43-47, wherein the remote unit comprises a remote antenna unit of a distributed antenna system (DAS), wherein the at least one processor is configured to disconnect the antenna from the downlink path in the remote antenna unit of the DAS by switching at least one switch of the downlink path in the remote antenna unit of the DAS and communicatively couple the antenna to an uplink path in the remote antenna unit of the DAS by switching at least one switch of the uplink path in the remote antenna unit of the DAS.

Example 49 includes the TDD switching sub-system of any of Examples 43-48, wherein the remote unit comprises a single-node repeater, wherein the at least one processor is configured to disconnect the antenna from the downlink path of the single-node repeater by switching at least one switch of the downlink path single-node repeater and communicatively couple the antenna to an uplink path single-node repeater by switching at least one switch of the uplink path single-node repeater.

Example 50 includes the TDD switching sub-system of any of Examples 43-49, wherein the at least one processor is further configured to determine a start time of the downlink signal and update the clock setting based on the determined start time of the downlink signal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for determining threshold signal power for a switching control module of a time-division-duplexing (TDD) switching sub-system comprising:
   setting a threshold signal power to a first value, wherein the threshold signal power is compared to a measured signal power of a downlink signal of a downlink path of a telecommunication system from a measurement receiver;
   determining a first downlink signal time using the first value;
   adjusting the threshold signal power to a second value;
   determining a second downlink signal time using the second value;
   determining a difference between the first downlink signal time and the second downlink signal time;
   when the difference between the first downlink signal time and the second downlink signal time does not exceed a predetermined threshold time, determining whether the second downlink signal time corresponds to a valid downlink signal time;
   when the second downlink signal time corresponds to a valid downlink signal time, setting a fixed threshold signal power for use during online operation of the switching control module.

2. The method of claim 1, wherein determining the first downlink signal time includes determining a start time and an end time for respective downlink subframes transmitted via the downlink path, wherein each start time or end time is determined based on whether the measured signal power exceeds the threshold signal power.

3. The method of claim 1, wherein the threshold time corresponds to a predetermined time period based on a length of one symbol.

4. The method of claim 1, wherein when the difference between the first downlink signal time and the second downlink signal time exceeds the threshold time, the method further comprises:
   adjusting the threshold signal power to a third value;
   determining a third downlink signal time using the third value;
   determining a difference between the second downlink signal time and the third downlink signal time;
   when the difference between the second downlink signal time and the third downlink signal time does not exceed the threshold time, determining whether the third downlink signal time corresponds to a valid downlink signal time;
   when the third downlink signal time corresponds to a valid downlink signal time, setting a fixed threshold signal power for use during an online mode of the switching control module.

5. The method of claim 1, wherein adjusting the threshold signal power comprises reducing the threshold signal power by a fixed amount.

6. The method of claim 1, wherein adjusting the threshold signal power comprises increasing the threshold signal power by a fixed amount.

7. The method of claim 1, wherein the TDD switching sub-system is included in a remote unit of a distributed antenna system (DAS), the method further comprising switching at least one switch of the downlink path of the remote unit of the DAS and at least one switch of an uplink path of the remote unit of the DAS in the online mode of operation using the fixed threshold signal power.

8. The method of claim 1, wherein the TDD switching sub-system is included in a single-node repeater, the method further comprising switching at least one switch of a downlink path of the single-node repeater and at least one switch of an uplink path of the single-node repeater in the online mode of operation using the fixed threshold signal power.

9. The method of claim 1, wherein the threshold signal power is provided to a comparator, wherein the comparator compares the threshold signal power to the measured signal power of the downlink signal of the downlink path of the telecommunication system from the measurement receiver and provides a signal to the at least one processor that is indicative of whether the measured signal power exceeds the threshold signal power.

10. A switching control module comprising:
   a measurement receiver configured for measuring a signal power of a downlink signal in a downlink path of a telecommunication system;
   at least one processor communicatively configured to:
      set the threshold signal power to a first value;
      determine a first downlink signal time using the first value;
      adjust the threshold signal power to a second value;
      determine a second downlink signal time using the second value;
      determine a difference between the first downlink signal time and the second downlink signal time;

when the difference between the first downlink signal time and the second downlink signal time does not exceed a threshold time, determine whether the second downlink signal time corresponds to a valid downlink signal time;

when the second downlink signal time corresponds to a valid downlink signal time, set the threshold signal power for use during online operation of the switching control module.

11. The switching control module of claim 10, wherein the at least one processor is configured to determine the first downlink signal time by determining a start time and an end time for respective downlink subframes transmitted via the downlink path, wherein each start time or end time is determined based on whether the measured signal power exceeding the threshold signal power.

12. The switching control module of claim 10, wherein the threshold time corresponds to a predetermined time period based on a length of one symbol.

13. The switching control module of claim 10, wherein when the difference between the first downlink signal time and the second downlink signal time exceeds the threshold time, the at least one processor is further configured to:
adjust the threshold signal power to a third value;
determine a third downlink signal time using the third value;
determine a difference between the second downlink signal time and the third downlink signal time;
when the difference between the second downlink signal time and the third downlink signal time does not exceed the threshold time, determine whether the third downlink signal time corresponds to a valid downlink signal time;
when the third downlink signal time corresponds to a valid downlink signal time, set the threshold signal power for use during an online mode of the switching control module.

14. The switching control module of claim 10, wherein the at least one processor is configured to adjust the threshold signal power by reducing the threshold signal power by a fixed amount.

15. The switching control module of claim 10, wherein the at least one processor is configured to adjust the threshold signal power by increasing the threshold signal power by a fixed amount.

16. The switching control module of claim 10, wherein the switching control module is included in a remote unit of a distributed antenna system (DAS), wherein the at least one processor is further configured to switch at least one switch of the downlink path of the remote unit of the DAS and at least one switch of an uplink path of the remote unit of the DAS in the online mode of operation using the fixed threshold signal power.

17. The switching control module of claim 10, wherein the switching control module is included in a single-node repeater, wherein the at least one processor is further configured to switch at least one switch of the downlink path of the single-node repeater and at least one switch of an uplink path of the single-node repeater in the online mode of operation using the fixed threshold signal power.

18. The switching control module of claim 10, further comprising a comparator having an input communicatively coupled to the measurement receiver and an output communicatively coupled to the at least one processor, wherein the comparator is configured to compare the threshold signal power with the measured signal power of the downlink signal received from the measurement receiver via the input, wherein the comparator is configured to provide a signal that is indicative of whether the measured signal power exceeds the threshold signal power to the at least one processor via the output.

19. A time division duplex (TDD) switching sub-system disposed in a remote unit of a telecommunication system, the TDD switching sub-system comprising:
at least one first switch positioned in a downlink path from a base station to an antenna of the remote unit, the at least one first switch configured for selectively connecting the antenna to the downlink path;
at least one second switch positioned in an uplink path from the antenna to the base station, the at least one second switch configured for selectively connecting the antenna to the uplink path;
a measurement receiver configured for measuring a signal power in the downlink path;
at least one processor configured to:
set a threshold signal power to a first value, wherein the signal power in the downlink path is compared to the threshold signal power;
determine a first downlink signal time using the first value;
adjust the threshold signal power to a second value;
determine a second downlink signal time using the second value;
determine a difference between the first downlink signal time and the second downlink signal time;
when the difference between the first downlink signal time and the second downlink signal time does not exceed a threshold time, determine whether the second downlink signal time corresponds to a valid downlink signal time;
when the second downlink signal time corresponds to a valid downlink signal time, set the threshold signal power for use during an online mode of the switching control module.

20. The TDD switching sub-system of claim 19, wherein the at least one processor is configured to determine the first downlink signal time by determining a start time and an end time for respective downlink subframes transmitted via the downlink path, wherein each start time or end time is determined based on whether the measured signal power exceeding the threshold signal power.

21. The TDD switching sub-system of claim 19, wherein the threshold time corresponds to a predetermined time period based on a length of one symbol.

22. The TDD switching sub-system of claim 19, wherein when the difference between the first downlink signal time and the second downlink signal time exceeds the threshold time, the at least one processor is further configured to:
adjust the threshold signal power to a third value;
determine a third downlink signal time using the third value;
determine a difference between the second downlink signal time and the third downlink signal time;
when the difference between the second downlink signal time and the third downlink signal time does not exceed the threshold time, determine whether the third downlink signal time corresponds to a valid downlink signal time;
when the third downlink signal time corresponds to a valid downlink signal time, set the threshold signal power for use during an online mode of the switching control module.

23. The TDD switching sub-system of claim 19, wherein the at least one processor is configured to adjust the threshold signal power by reducing the threshold signal power by a fixed amount.

24. The TDD switching sub-system of claim 19, wherein the at least one processor is configured to adjust the threshold signal power by increasing the threshold signal power by a fixed amount.

25. The TDD switching sub-system of claim 19, wherein the remote unit comprises a remote antenna unit of a distributed antenna system (DAS), wherein the at least one processor is further configured to switch the at least one first switch of the downlink path of the remote unit of the DAS and the at least one second switch of the uplink path of the remote unit of the DAS in the online mode of operation using the fixed threshold signal power.

26. The TDD switching sub-system of claim 19, wherein the remote unit comprises a single-node repeater, wherein the at least one processor is further configured to switch the at least one first switch of the downlink path of the single-node repeater and the at least one second switch of the uplink path of the single-node repeater in the online mode of operation using the fixed threshold signal power.

27. The TDD switching sub-system of claim 19, further comprising a comparator having an input communicatively coupled to the measurement receiver and an output communicatively coupled to the at least one processor, wherein the comparator is configured to compare the threshold signal power with the measured signal power of the downlink signal received from the measurement receiver via the input, wherein the comparator is configured to provide a signal that is indicative of whether the measured signal power exceeds the threshold signal power to the at least one processor via the output.

* * * * *